United States Patent
Kanasaki et al.

(10) Patent No.: US 7,310,474 B2
(45) Date of Patent: Dec. 18, 2007

(54) UNIT INSTALLED IN ELECTRONIC EQUIPMENT AND CONNECTION MECHANISM OF TRANSMISSION LINE OF THE ELECTRONIC EQUIPMENT

(75) Inventors: Katsumi Kanasaki, Kawasaki (JP); Katsuki Matsunaga, Kawasaki (JP); Seiichiro Sato, Kawasaki (JP); Tomoyuki Hongoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/006,069

(22) Filed: Dec. 7, 2004

(65) Prior Publication Data

US 2005/0105879 A1    May 19, 2005

Related U.S. Application Data

(63) Continuation of application No. PCT/JP2002/012528, filed on Nov. 29, 2002.

(51) Int. Cl.
   *G02B 6/00* (2006.01)

(52) U.S. Cl. ............... 385/147; 385/134; 385/135

(58) Field of Classification Search .......... 385/53–93, 385/134–137
See application file for complete search history.

(56) References Cited

U.S. PATENT DOCUMENTS

| | | | | |
|---|---|---|---|---|
| 5,363,467 A | * | 11/1994 | Keith | 385/135 |
| 5,588,079 A | * | 12/1996 | Tanabe et al. | 385/78 |
| 5,708,742 A | * | 1/1998 | Beun et al. | 385/53 |
| 5,724,467 A | * | 3/1998 | vandenEnden et al. | 385/134 |
| 6,270,262 B1 | * | 8/2001 | Hudgins et al. | 385/88 |
| 6,305,848 B1 | * | 10/2001 | Gregory | 385/53 |
| 6,406,304 B1 | * | 6/2002 | Kuo | 439/64 |
| 6,419,399 B1 | * | 7/2002 | Loder et al. | 385/53 |
| 6,438,310 B1 | * | 8/2002 | Lance et al. | 385/135 |
| 6,623,177 B1 | * | 9/2003 | Chilton | 385/88 |
| 6,672,771 B2 | * | 1/2004 | Cox et al. | 385/53 |
| 6,840,681 B2 | * | 1/2005 | Shibutani et al. | 385/53 |
| 2003/0165298 A1 | * | 9/2003 | Ngo | 385/53 |

FOREIGN PATENT DOCUMENTS

| | | |
|---|---|---|
| JP | 07-19190 | 1/1995 |
| JP | 2643894 | 8/1996 |
| JP | 2001-119177 | 4/2001 |
| JP | 2001-235632 | 8/2001 |
| JP | 2002-305389 | 10/2002 |

\* cited by examiner

*Primary Examiner*—Tina M. Wong
(74) *Attorney, Agent, or Firm*—Katten Muchin Rosenman LLP

(57) ABSTRACT

A unit installed in electronic equipment includes a connector configured to connect a transmission line of the electronic equipment, and an access plate where a plurality of the connectors are provided. The access plate is slide-able against the electronic equipment.

6 Claims, 16 Drawing Sheets

US 7,310,474 B2

UNIT INSTALLED IN ELECTRONIC EQUIPMENT AND CONNECTION MECHANISM OF TRANSMISSION LINE OF THE ELECTRONIC EQUIPMENT

CROSS-REFERENCE TO RELATED APPLICATION

This application is a U.S. continuation application filed under 35 USC 111(a) and claiming benefit under 35 USC 120 and 365(c) of PCT application No. JP2002/012528 filed on Nov. 29, 2002. The foregoing application is hereby incorporated by reference.

BACKGROUND OF THE INVENTION

1. Field of the Invention

The present invention generally relates to units installed in electronic equipment and connection mechanisms of transmission lines of the electronic equipment, and more particularly, to a unit installed in electronic equipment which implements an information process or communication by applying an optical fiber as a transmission line for an optical signal, and a connection mechanism of the optical fiber.

2. Description of the Related Art

In electronic equipment such as optical communication equipment used for optical communication wherein an optical signal is used, a core network is required to have a mass capacity as data communication increases or transmission demand accompanied with spread of the Internet increases. Because of this, it is requested for the electronic equipment to have a high density installed devices or achieve a large capacity information transmission or a high functional information transmission.

For corresponding to the above-mentioned request, a WDM (Wavelength Division Multiplexing) type of electronic equipment or an OXC (Optical Cross Connect) device is now spotlighted. The WDM type electronic equipment is suitable for a long distance transmission or a large volume transmission. The OXC device has a switching function by which it switches optical signals in a large number of optical fibers every wavelength.

In the above-mentioned WDM type electronic equipment or the OXC device, however, as for seeking a large volume transmission or a large switching volume of an optical signal, the number of connections of optical fibers from both inside and outside of the electronic equipment increases. Accordingly, for the electronic equipment such as the optical communication equipment used for the optical communication system wherein the optical signal is used, it is required to efficiently mount the optical fiber, which is capable of a large volume transmission at a high density, so that the inside and outside of the equipment are connected.

In a related art optical communication device, the following structure is applied in order to connect optical fibers from inside and outside of the optical communication device. That is, an adaptor is installed in a power interface unit (PIU) provided inside of the optical communication device. The adaptor is used for connecting a connector of the optical fibers.

FIG. 1 is a perspective view showing a first example of a related art connection mechanism of the optical fiber. Referring to FIG. 1, a print board (not shown in FIG. 1) is provided inside of a related art power interface unit 10. The power interface unit 10 has a unit surface plate 11 provided in the X1 direction in FIG. 1. Notch parts 13 are formed at a side of an internal circumference so as to fix a lot of adaptors 12 for connecting optical fiber.

The adaptor 12 connects an optical fiber 14 from outside of the power interface unit 10 and an optical fiber (not shown in FIG. 1) from inside of the power interface unit 10. An optical connector 15 provided at an end part of the optical fiber 14 is capable of being inserted into the adaptor 12.

In the optical connector 15, an optical connector engaging part 16 is provided in the Y1 direction in FIG. 1. When the optical connector 15 is inserted into the adaptor 12, the optical connector 15 is locked and fixed to the adaptor 12 by the optical connector engaging part 16. Therefore, the optical fiber 14 from the outside of the power interface unit 10 comes in contact with and optically connects to the optical fiber from the inside of the power interface unit 10, by the adaptor 12.

Furthermore, a lock between the optical connector 15 and the adaptor 12 is turned off by giving a pushing pressure to the optical connector engaging part 16 of the optical connector 15 which is locked and fixed by the adaptor 12, so that the optical fiber 14 can be pulled out from the adaptor 12.

Under this structure, a larger number of the optical fibers 14 are detachably connected to the adaptors 12 by the optical connectors 15. The optical fiber 14 is, for example, detached in a case of construction for providing the optical communication equipment or maintenance for the optical communication equipment.

However, in the connection structure of the optical fiber 14 shown in FIG. 1, it is necessary to operate a large number of the optical connector engaging parts 16 in order to detach or connect a large number of optical fibers 14 from or to the adaptors 12. Therefore, it is necessary to provide an operations area having a space sufficient to operate the optical connector engaging parts 16, around the adaptors 12 in the unit surface plate 11.

Accordingly, as shown in FIG. 1, in a case where a large number of adaptors 12 are provided on the unit surface plate 11 in order to connect the optical fibers 14, it is difficult to narrow a space between neighboring adaptors 12. Hence, under the structure shown in FIG. 1, it is difficult to mount a large number of the optical fibers 14 on the unit surface plate 11 at a high density.

FIG. 2-(a) is a rear view, FIG. 2-(b) is a side view, and FIG. 2-(c) is a front view, showing a second example of a related art connection mechanism of the optical fibers. Referring to FIG. 2, a rotating plate 21 is provided inside of a related art power interface unit 20.

Adaptors 22 for connecting optical connector are fixed to the rotating plate 21. An optical connector 25 provided at an end part of an optical fiber 24 from outside of the power interface unit 20 and an optical connector 27 provided at an end part of an optical fiber 26 from inside of the power interface unit 20 are connected to the adaptor 22.

When the optical fiber 24 from the outside of the power interface unit 20 is detached or connected from or to the adaptor 22, the rotating plate 21 where the adaptor 22 is fixed is rotated in a direction shown by an arrow in FIG. 2-(b) so that the adaptor 22 is pulled out to a side in the X1 direction in FIG. 2-(b).

However, under the connection structure of the optical fibers shown in FIG. 2, there is a disadvantage when the number of the optical fibers 24 increases.

That is, if the number of the adaptors 22 fixed to a single rotating plate 21 is increased in order to increase the number of the optical fibers 24, it is necessary to make an operations space in a depth direction, the X2 direction in FIG. 2-(b), of the power interface unit 20. Therefore if there is no limitation on the depth direction of the power interface unit 20, it is possible to correspond to the increase of the optical fibers 24.

Furthermore, if the number of the rotating plates 21, where the adaptors 22 are fixed, is increased in a height direction inside of the power interface unit 20, namely in the Y1-Y2 direction in FIG. 2-(b), in order to increase the number of the optical fibers 24, it is necessary to make an operations space in the height direction of the power interface unit 20. Therefore if there is a limitation on the height direction of the power interface unit 20, it is not possible to correspond to the increase of the optical fibers 24.

In addition, in a case where plural rotating plates 21 are provided in the height direction inside of the power interface unit 20, if each of the rotating plates 21 is rotated, the optical fibers 24 neighboring up and down may interfere with each other. To avoid this, it is necessary for each of the rotating plates 21 to be provided at the power interface unit 20 with a designated space. Because of this, a dead space is formed inside of the power interface unit 20 where each of the rotating plates 21 is formed.

Accordingly, under the connection structure of the optical fiber shown in FIG. 2, it is difficult to practically and effectively use a mounting space of the adaptor 22 and the optical fiber 24 inside of the power interface unit 20.

Meanwhile, Japan Laid-Open Patent Application No. 2001-235632 discloses an optical wiring board and method for connecting/disconnecting an optical fiber. However, in this related art invention, it is necessary to form an operations space around an optical connector which is a subject of the operation and therefore it is not possible to solve the above-discussed problems.

SUMMARY OF THE INVENTION

Accordingly, it is a general object of the present invention to provide a novel and useful unit installed in electronic equipment and a connection mechanism of a transmission line of the electronic equipment, in which one or more of the problems described above are eliminated.

Another and more specific object of the present invention is to provide a unit installed in electronic equipment and a connection mechanism of a transmission line of the electronic equipment, whereby it is possible to mount a large-number of the transmission lines at a high density by efficiently using a limited space in the electronic equipment, and furthermore it is possible to smoothly connect the transmission line and the connector.

The above object of the present invention is achieved by a unit installed in electronic equipment, including:

a connector configured to connect a transmission line of the electronic equipment; and an access plate where a plurality of the connectors are provided;

wherein the access plate is slide-able against the electronic equipment.

The above object of the present invention is also achieved by a connection mechanism for connecting a transmission line of electronic equipment to each of a plurality of connectors provided at a unit installed in the electronic equipment, including:

an access plate which has the connectors and is provided in the unit;

wherein the access plate slides from the unit so that the transmission line can be connected to the connector.

Other objects, features, and advantages of the present invention will become more apparent from the following detailed description when read in conjunction with the accompanying drawings.

BRIEF DESCRIPTION OF THE DRAWINGS

FIG. 14 is pulled out from the support plate 400 in the X1 direction of FIG. 13 and FIG. 14.

DETAILED DESCRIPTION OF THE PREFERED EMBODIMENTS

A description is next given, with reference to FIG. 3 through FIG. 12, of embodiments of the present invention.

First Embodiment

Figure 1:
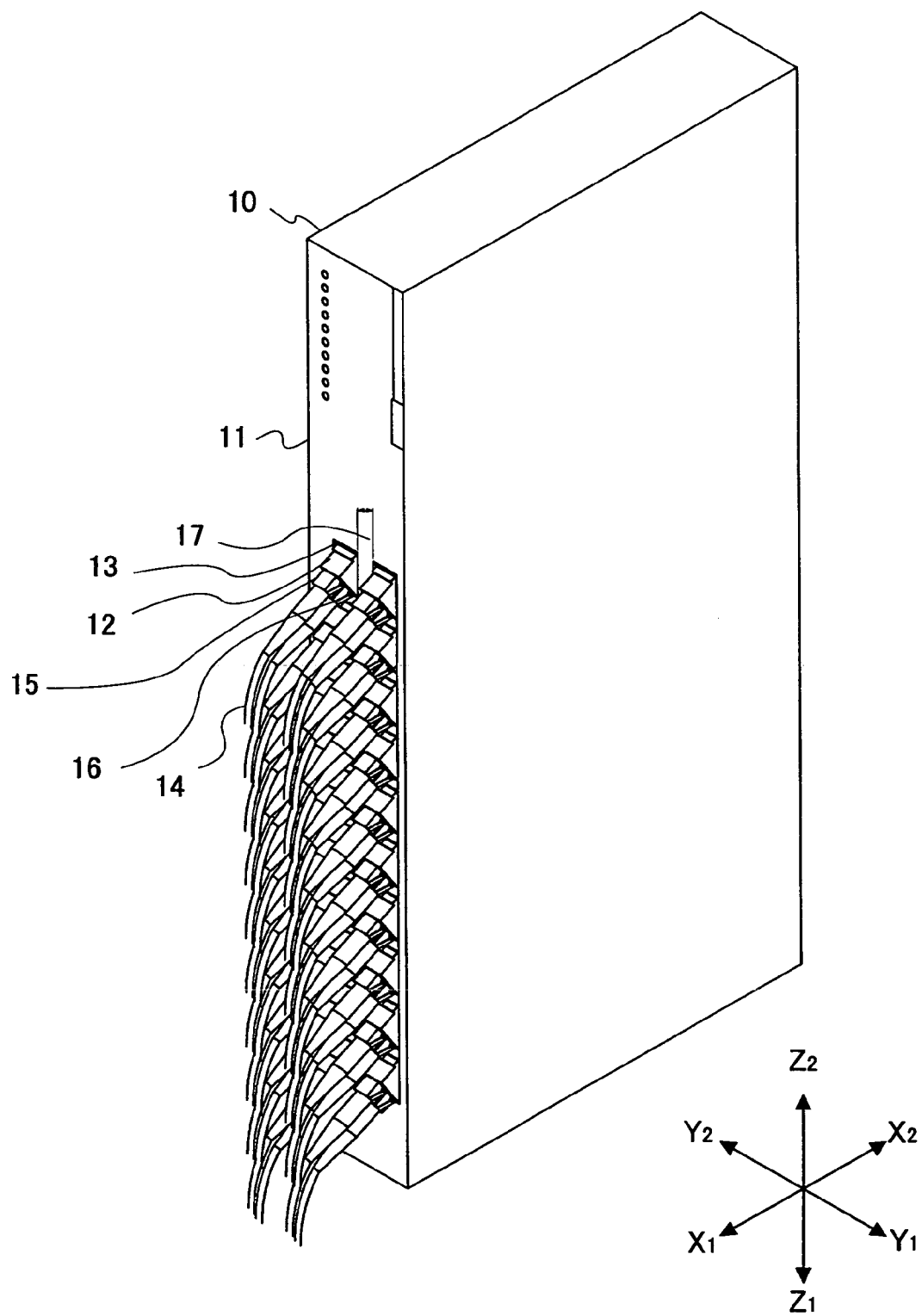
FIG. 1 is a perspective view showing a first example of a related art connection mechanism of an optical fiber.
Figure 2:
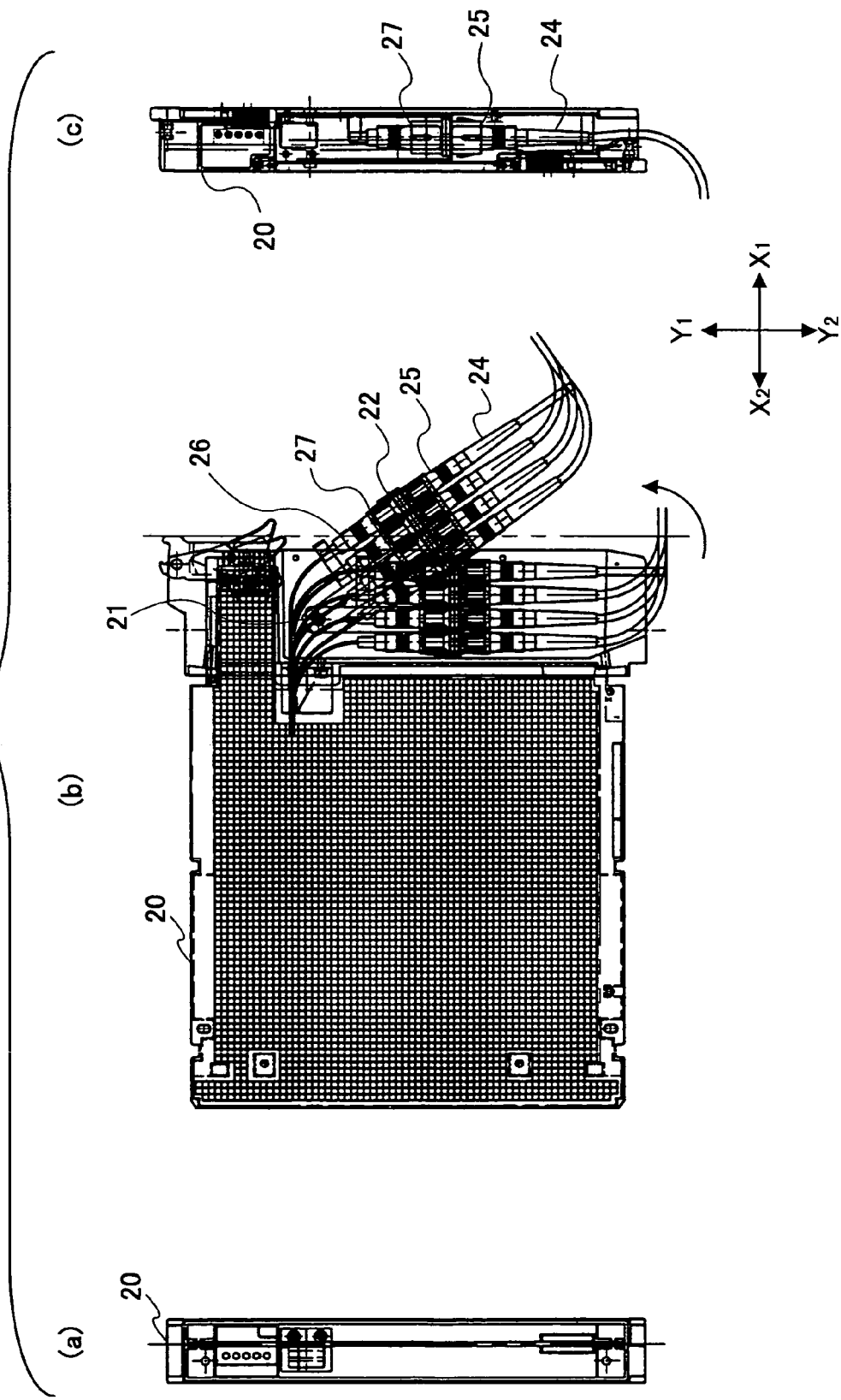
FIG. 2 is a view showing a second example of a related art connection mechanism of an optical fiber.
Figure 3:
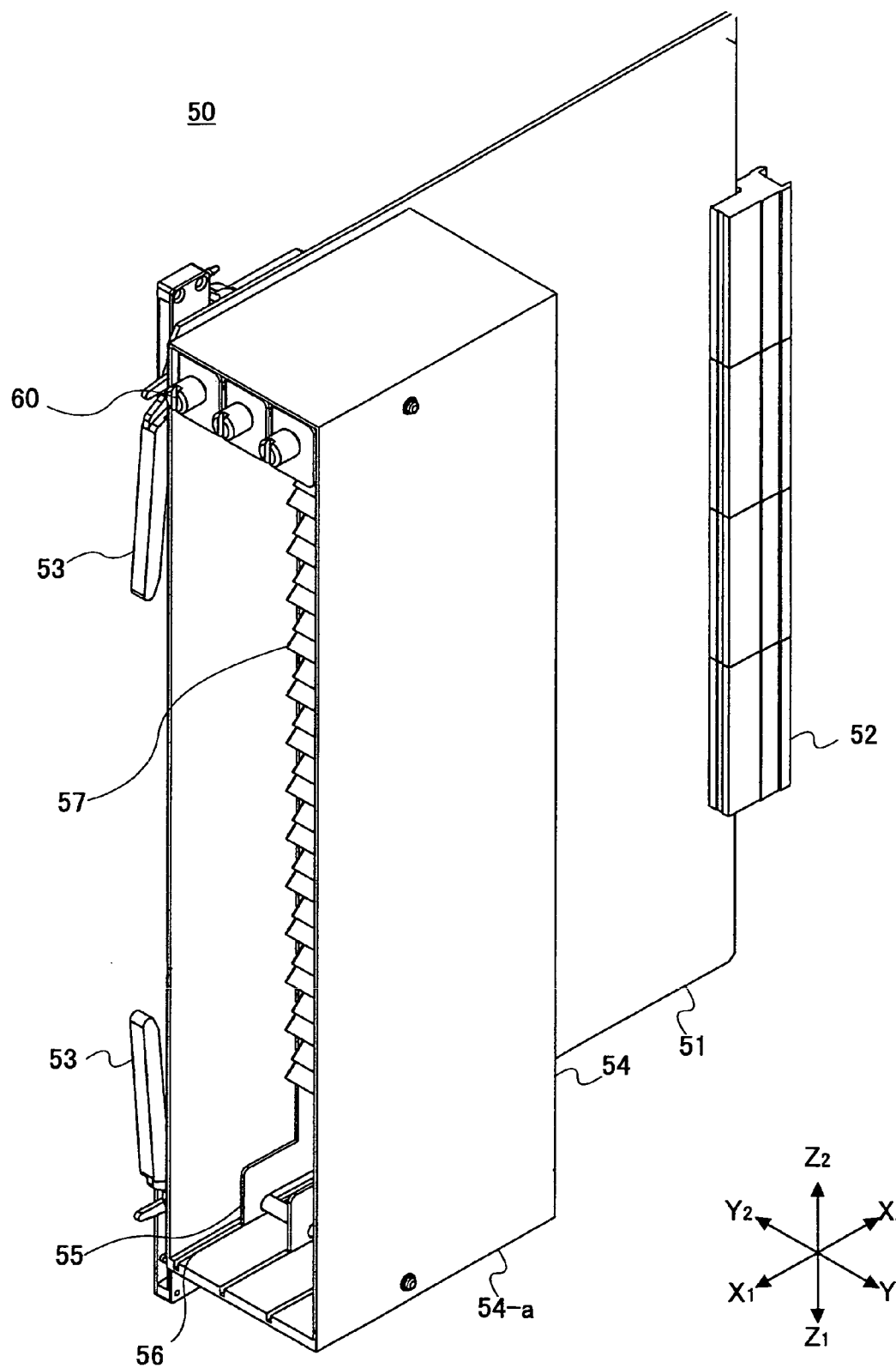
FIG. 3 is a perspective view showing an electric power interface unit 50 of a first embodiment of the present invention.

FIG. 3 is a perspective view showing a power interface unit 50 of a first embodiment of the present invention.

Referring to FIG. 3, the power interface unit 50 having a connection mechanism of an optical fiber of the first embodiment of the present invention includes a print board 51, a connector 52, an insert-extract operation part 53, an access plate receiving part 54 and others.

The insert-extract operation part 53 and the access plate receiving part 54 are provided at a front part of the power interface unit 50, namely at a side in the X1 direction, in a state where the print board 51 is put between the insert-extract operation part 53 and the access plate receiving part 54. The connector 52 is provided in the print board 51 at a rear part of the power interface unit 50, namely at a side in the X2 direction.

If the power interface unit 50 is arranged on a shelf (not shown in FIG. 3) of the optical communication equipment and the insert-extract operation part 53 of the power interface unit 50 is operated, the power interface unit 50 moves into the shelf in the X2 direction so that the print board 51 of the power interface unit 50 is electrically connected to the shelf.

The access plate receiving part 54 receives a plurality of the access plates 55. Each of the access plates 55 slides in a groove forming part 56 formed in a bottom part of the access plate receiving part 54 at a side of the Z1 direction.

The access plate 55, for example, is made of stainless. In the each of the access plates 55, a lot of adaptor parts-57 as connectors are provided in the Z1-Z2 direction in parallel so as to be inclined at a designated angle against the X-Y plane. An outside optical fiber 58 and an inside optical fiber 59 are connected to the adaptor part 57.

Figure 4:
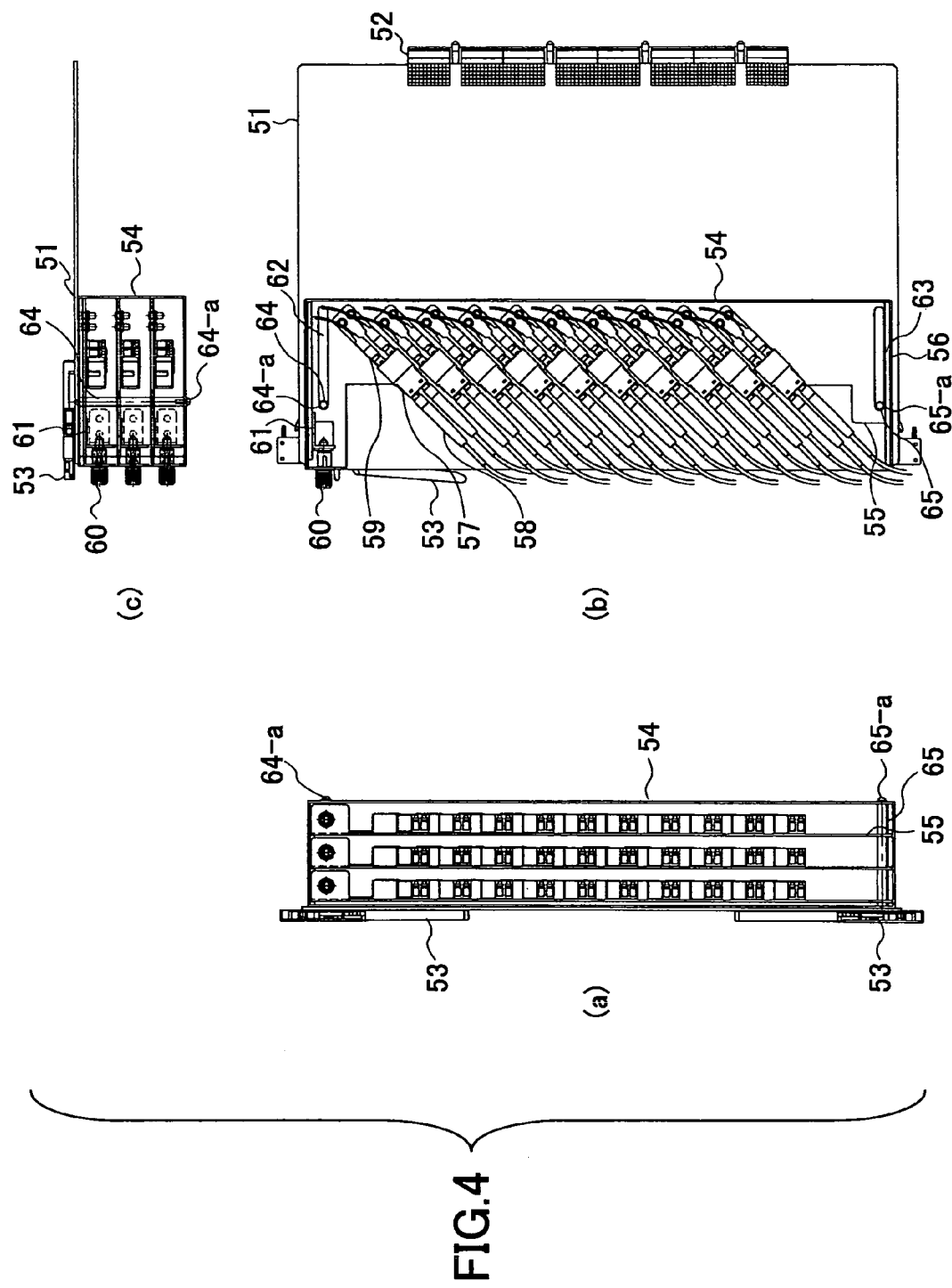
FIG. 4 is a view showing the power interface unit 50 of the first embodiment of the present invention in a state where an outside optical fiber 58 and an inside optical fiber 59 are connected to an adaptor part 57 provided at an access plate 55 received in an access plate receiving part 54.

FIG. 4 is a view showing the power interface unit 50 of the first embodiment of the present invention in a state where the outside optical fiber 58 and the inside optical fiber 59 are connected to the adaptor part 57 provided at the access plate 55 received in the access plate receiving part 54. More specifically, FIG. 4-(a) is a front view, FIG. 4-(b) is a side view in a state where the side surface plate 54-a (See FIG. 3) is removed from the access plate receiving part 54, and FIG. 4-(c) is a plan view. Although three access plates 55 are received in the access plate receiving part 54 in FIG. 4, there is no limitation regarding the number of the access plates 55 received in the access plate receiving part 54 in this embodiment.

The outside optical fiber 58 is an optical fiber connected to the adaptor part 57 from the outside of the power interface unit 50. The inside optical fiber 59 is an optical fiber connected to the adaptor part 57 from the inside of the power interface unit 50. Both the outside optical fiber 58 and the inside optical fiber 59 function as transmission lines to the optical communication equipment.

Referring to FIG. 4, a screw part 60 for fixing is provided at an upper part of the access plate 55. The screw part 60 for fixing is screw-fixed to a metal fitting 61 for fixing the screw part 60 which is provided at the access plate receiving part 54. Therefore, the access plate 55 is received by the access plate receiving part 54, by screw-fixing the screw part 60 to the metal fitting 61 so that the access plate 55 is fixed to the access plate receiving part 54. If the screw-fixing between the screw part 60 and the metal fitting 61 is off (not screw-fixed), the access plate 55 can be pulled out from the access plate receiving part 54.

A slit forming part 62 is formed at the upper part of the access plate 55. The slit forming part 62 is provided in parallel with the groove forming part 56 formed at the lower part of the access plate receiving part 54. Furthermore, a slit forming part 63 is formed at the lower part of the access plate 55. The slit forming part 63 is provided in parallel with the groove forming part 54 formed at the lower part of the access plate receiving part 54.

Stick members 64 and 65 which pierce the slit forming parts 62 and 63 of each of the access plates 55 are provided at left ends of the slit forming parts 62 and 63 in FIG. 4. The stick members 64 and 65 are fixed to the access plate receiving part 54 by connection metal fittings 64-a and 65-a. The stick members 64 and 65 and the connection metal fittings 64-a and 65-a function as stoppers against sliding of the access plate 55, namely slide stopping members, so that the access plate 55 is prevented from being pulled out from the access plate receiving part 54 more than necessary.

Under the above-mentioned structure, while the access plate 55 can be smoothly slid in the grove forming part 56 of the access plate receiving part 54, sliding of the access plate 55 is stopped by contact between the stick members 64 and 65 and the right ends of the slit parts 62 and 63 so that the access plate 55 is prevented from being out from the access plate receiving part 54.

Figure 5:
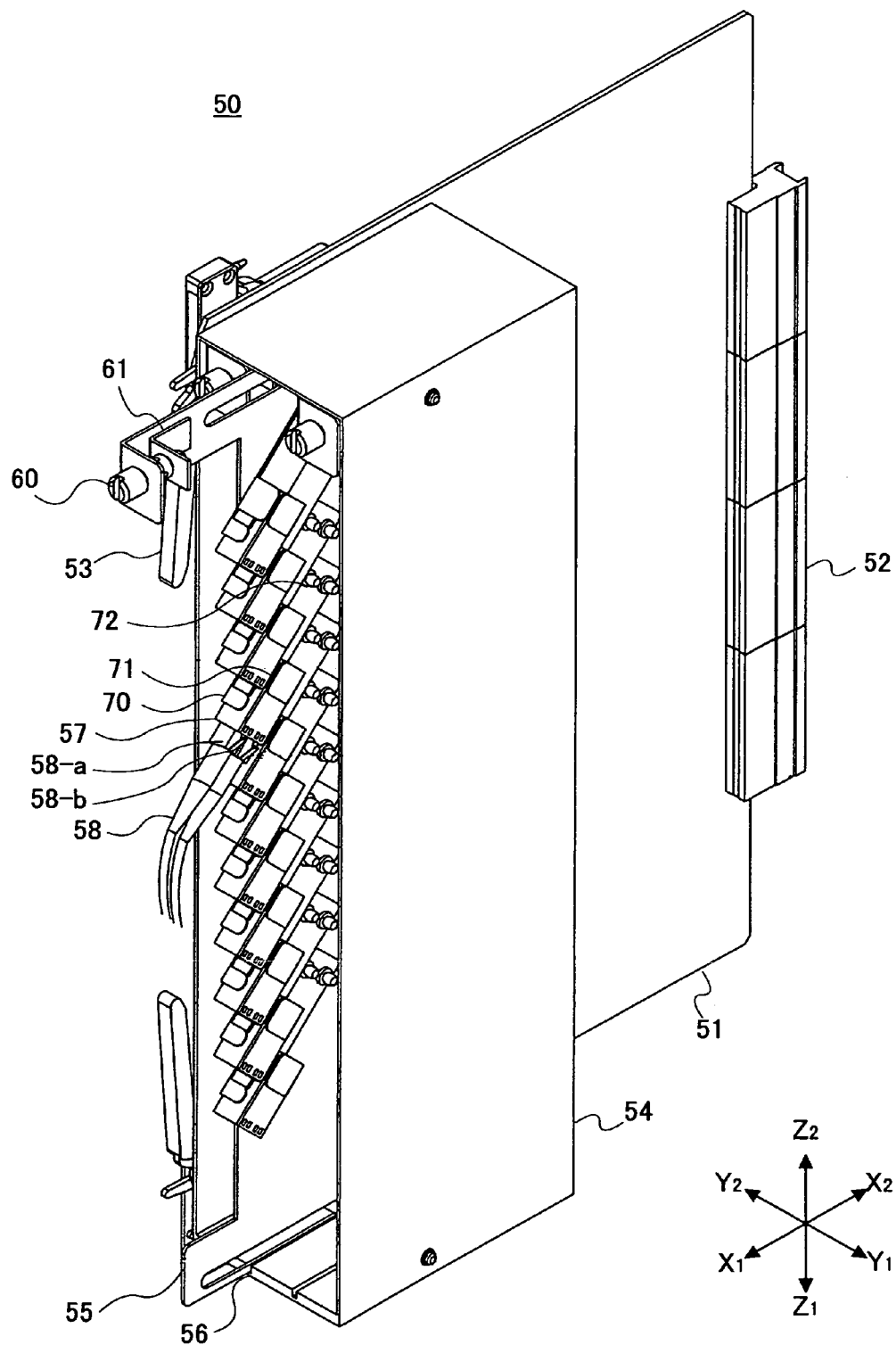
FIG. 5 is a view showing the power interface unit 50 of the first embodiment of the present invention in a state where the outside optical fiber 58 is connected to the adaptor part 57 provided at the access plate 55 and the access plate 55 is pulled out from the access plate receiving part 54.
Figure 6:
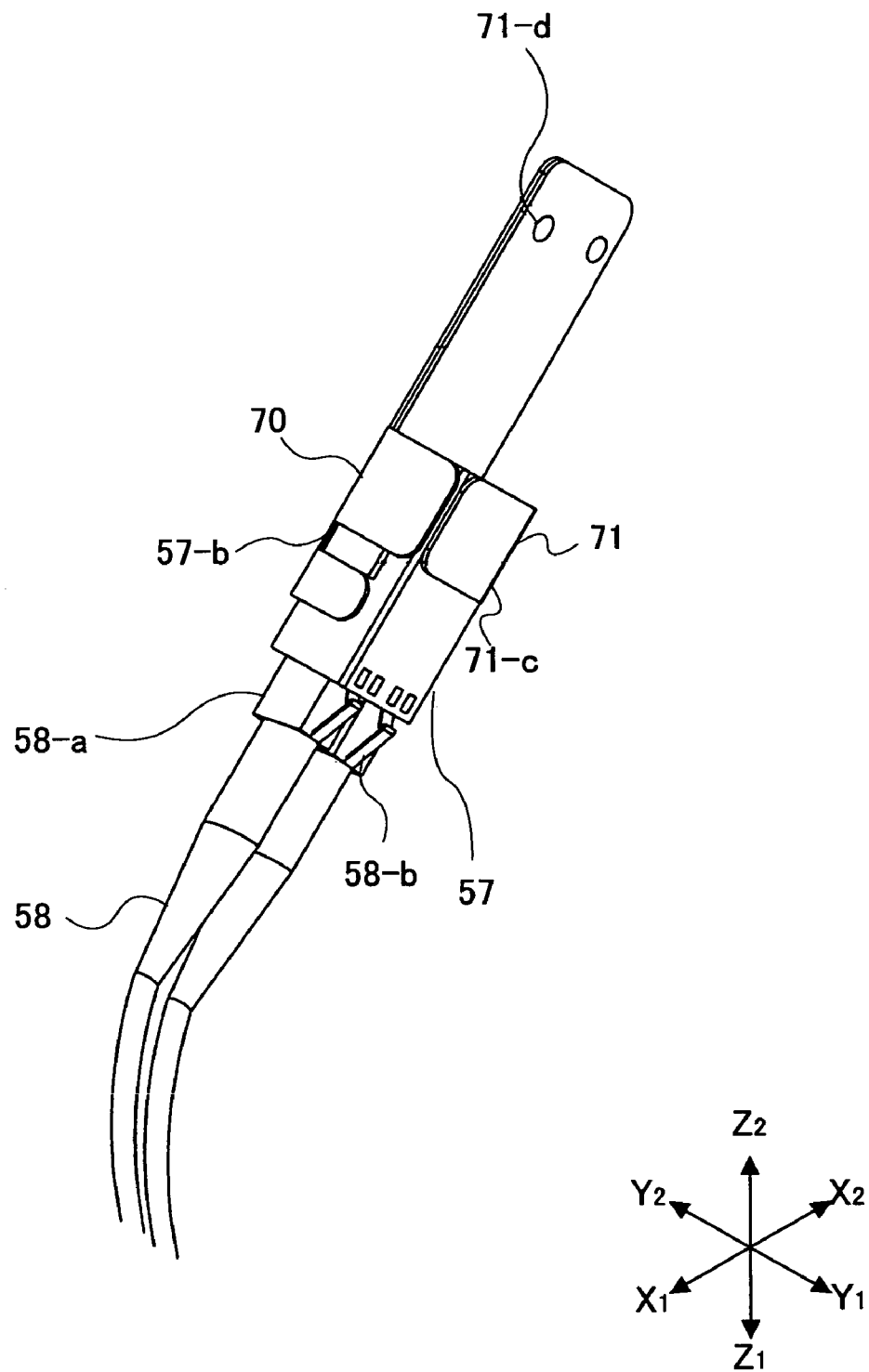
FIG. 6 is an enlarged perspective view showing the adaptor part 57 shown in FIG. 5 and the outside optical fiber 58 connected to the adaptor part 57.

FIG. 5 is a view showing the power interface unit 50 of the first embodiment of the present invention in a state where the outside optical fiber 58 is connected to the adaptor part 57 provided at the access plate 55 and the access plate 55 is pulled out from the access plate receiving part 54. FIG. 6 is an enlarged perspective view showing the adaptor part 57 shown in FIG. 5 and the outside optical fiber 58 connected to the adaptor part 57. In FIG. 5, for the convenience of explanation, a state where only one twinned outside optical fiber 58 is connected to one adaptor part 57 is shown and an illustration of connection of other outside optical fibers 58, the inside optical fibers 59, and the additional adaptor parts 57 is omitted.

Referring to FIG. 5 and FIG. 6, a twinned outside optical fibers 58 is provided in the Z1-Z2 direction and connected to the adaptor part 57. One fiber is for IN to the optical communication equipment and the other one is for OUT from the optical communication equipment. The outside optical fiber 58 is connected to the adaptor part 57 by inserting an outside optical fiber connector 58-a provided at the head end of the outside optical fiber 58 to the adaptor part 57.

The outside optical fiber connector 58-a provided at the head end of the outside optical fiber 58 is inserted into the adaptor part 57 and comes in contact with the inside optical fiber 59 connected to the adaptor part 57 from a side opposite to the outside optical fiber 58, so that the outside optical fiber 58 and the inside optical fiber 59 are optically and detachably connected to each other.

An outside optical fiber connector engaging part 58-b is provided at the outside optical fiber connector 58-a so that the outside optical fiber 58 is connected and lock-fixed to the adaptor part 57. A lock between the outside optical fiber connector 58-a and the adaptor 57 is turned off by giving a pushing pressure to the outside optical fiber connector engaging part 58-*b* of the outside optical fiber connector 58-*a* which is locked and fixed by the adaptor part 57, so that the outside optical fiber 58 can be pulled out from the adaptor part 57.

In FIG. 5 and FIG. 6, the outside optical fiber connector engaging part 58-*b* of the outside optical fiber connector 58-*a* is provided in the Y1 direction. This structure is effective in a case where there is a limitation on the length in the horizontal direction, namely in the Y1-Y2 direction in FIG. 5, in the optical communication equipment. That is to say, hypothetically if the adaptor part 57 is provided so that the outside optical fiber connector engaging part 58-*b* is situated in the Z1 or Z2 direction in FIG. 5 and FIG. 6, the length in the Y1-Y2 direction in FIG. 5 and FIG. 6 occupied by the adaptor part 57 is longer than the length shown in FIG. 5 and FIG. 6 and therefore this hypothetical case does not correspond to a case where there is a limitation on the horizontal length, namely the length in the Y1-Y2 direction in FIG. 5 and FIG. 6.

However, under the structure shown in FIG. 5 and FIG. 6, the length in the Y1-Y2 direction in FIG. 5 and FIG. 6 occupied by the adaptor part 57 can be made short. Therefore, the structure shown in FIG. 5 and FIG. 6 can correspond to the case where there is a limitation on the horizontal length, namely the length in the Y1-Y2 direction in FIG. 5 and FIG. 6. That is, it is possible to easily connect and detach the outside optical fiber 58 to and from the adaptor part 57 by pulling out the access plate 55 where the adaptor part 57 is provided.

Although, in the example shown in FIG. 5 and FIG. 6, the adaptor part 57 is provided at the Y1 side of the access plate 55 in FIG. 5 and therefore the outside optical fiber connector engaging part 58-*b* is also at the Y1 side, the present invention is not limited to this structure. That is, the adaptor part 57 may be provided at the Y2 side of the access plate 55 in FIG. 5 and therefore the outside optical fiber connector engaging part 58-*b* may be at the Y2 side.

Figure 7:
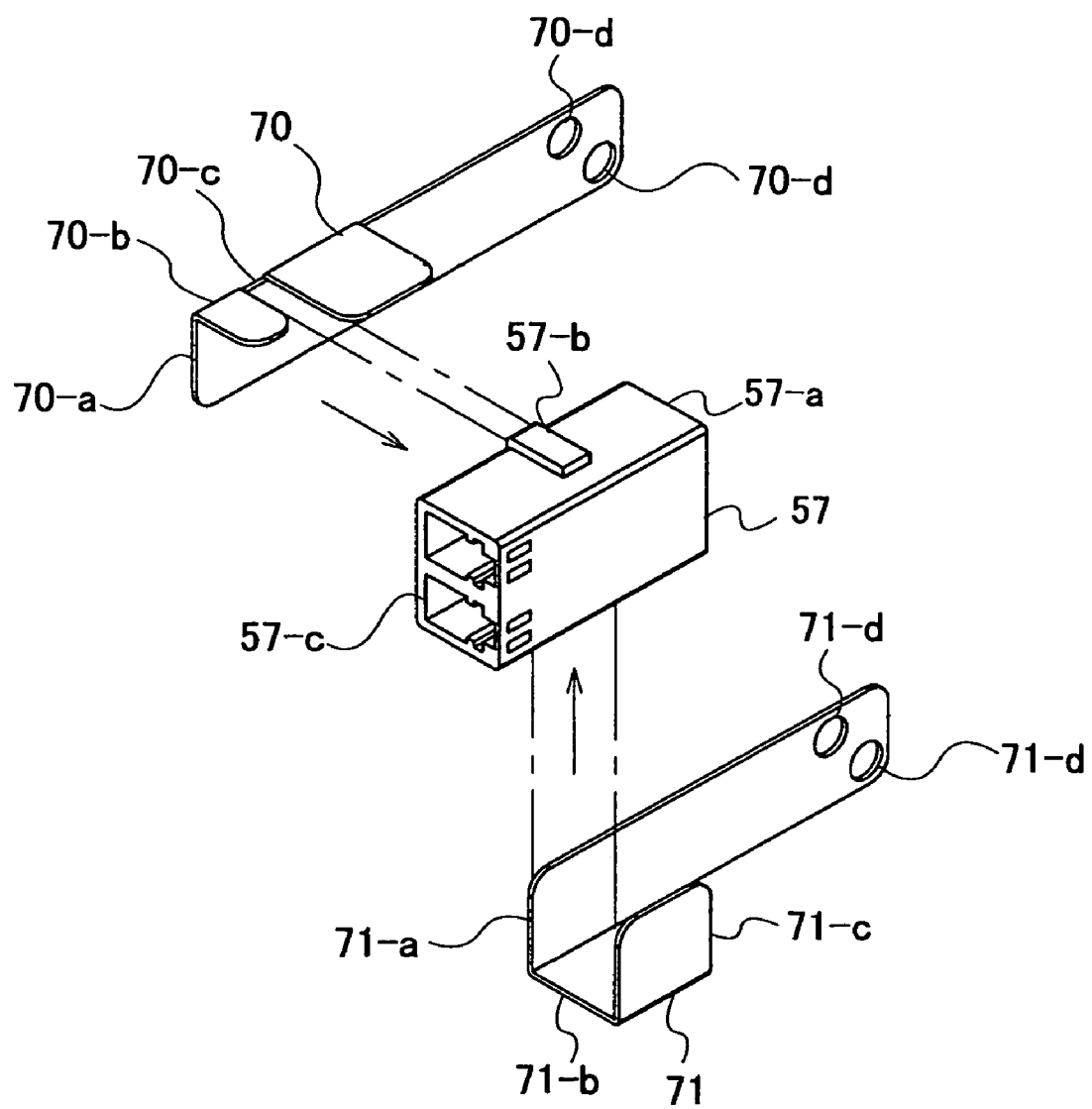
FIG. 7 is a view showing a structure where a first adaptor support metal fitting 70 and a second adaptor support metal fitting 71 are installed on the adaptor part 57.

Next, a structure for installing the adaptor part 57 on the access plate 55 is discussed. FIG. 7 is a view showing a structure where a first adaptor support metal fitting 70 and a second adaptor support metal fitting 71 are installed on the adaptor part 57.

Referring to FIG. 6 and FIG. 7, the adaptor part 57 is put between the first adaptor support metal fitting 70 and the second adaptor support metal fitting 71. A projection part 57-*b* is formed on an upper surface 57-*a* (namely a surface in the Z2 direction in FIG. 6) of the adaptor part 57. Two opening parts 57-*c* are formed on a front surface (namely a surface in the X1 direction in FIG. 5) of the adaptor part 57. The outside optical fiber connector 58-*a* provided at the end part of the outside optical fiber 58 is inserted into the opening part 57-*c* so that the outside optical fiber 58 is connected to the adaptor part 57.

A side surface 71-*a* is provided in the X1-X2 direction in the second adaptor support metal fitting 71 in FIG. 6. The second adaptor support metal fitting 71 also has a lower surface 71-*b* which is situated perpendicular to the side surface 71-*a* and extended from the side surface 71-*a*, and a side surface 71-*c* which is situated parallel with the side surface 71-*a* and extended from the lower surface 71-*b*. The adaptor part 57 is covered by the side surface 71-*a*, the lower surface 71-*b* and the side surface 71-*c* of the second adaptor support metal fitting 71.

A side surface 70-*a* is provided in the X1-X2 direction in the first adaptor support metal fitting 70 in FIG. 6. The first adaptor support metal fitting 70 also has an upper surface 70-*b* which is situated perpendicular to the side surface 70-*a* and extended from the side surface 70-*a*. The upper surface 70-*b* has an engaging part 70-*c*. The projection part 57-*b* of the adaptor part 57 is engaged with the engaging part 70-*c* of the first adaptor support metal fitting 70 so that the first adaptor support metal fitting 70 is fixed to the adaptor part 57.

Thus, the adaptor part 57 is covered with the second adaptor support metal fitting 71 as a covering member and fixed by the first adaptor support metal fitting 70.

Meanwhile, the side surface 70-*a* of the first adaptor support metal fitting 70 and the side surface 71-*a* of the second adaptor support metal fitting 71 have substantially the same configurations and areas. Therefore, the adaptor part 57 is covered with the second adaptor support metal fitting 71 and fixed by the first adaptor support metal fitting 70 so that the side surface 70-*a* of the first adaptor support metal fitting and the side surface 71-*a* of the second adaptor support metal fitting 71 are overlapped up and down. Furthermore, hole forming parts 70-*d* are formed in the designated position in the side surface 70-*a* of the first adaptor support metal fitting 70 and hole forming parts 71-*d* are formed in the designated position in the side surface 71-*a* of the first adaptor support metal fitting 71 so that the hole forming parts 70-*d* and 71-*d* are-overlapped.

Rivets are provided in the hole forming parts 70-*d* formed in the side surface 70-*a* of the first adaptor support metal fitting 70, the hole forming parts 71-*d* formed in the side surface 71-*a* of the second adaptor support metal fitting 71, and hole forming parts (not shown in FIG. 6) formed in designated positions inside of the access plate 55 corresponding to the hole forming parts 70-*d* and 71-*d*, so that the adaptor part 57 is mounted on and fixed to the access plate 55.

Although the adaptor part 57 is first covered with the second adaptor support metal fitting 71 and then fixed by the first adaptor support metal fitting 70 in the above-mentioned example, the adaptor part 57 may first be fixed by the first adaptor support metal 70 and then covered with the second adaptor support metal fitting 71.

Thus, it is possible to mount and fix the adaptor part 57 on the access plate 55 by a minimum member such as the first adaptor support metal fitting 70 and second adaptor support metal fitting 71.

According to the first embodiment of the present invention, it is possible to easily lock-operate the outside optical fiber connector engaging part 58-*b* and the adaptor part 57 by only pulling the access plate 55 from the access plate receiving part 54 so that the outside optical fiber 58 can be connected to or detached from the adaptor part 57.

That is, according the above-mentioned mechanism, by pulling the access plate 55 where a large number of the adaptor parts 57 are provided, it is possible to provide an operations area in the vicinity of the adaptor part 57. Therefore, it is possible to provide the adaptor parts 57 on the power interface unit 50 at a high density without unnecessary gaps. Furthermore, it is possible to connect or detach the outside optical fiber 58 to or from the adaptor part 57 without interfering with neighboring other outside optical fibers 58. Therefore, it is possible to realize an optical interface for a large number of channels by a simple mechanism and at a high density.

Second Embodiment

Next, the second embodiment of the present invention is discussed. In the second embodiment, parts that are the same as the parts shown in the first embodiment are given the same reference numerals, and explanation thereof is omitted.

In the first embodiment of the present invention, the adaptor part 57 is fixed to the access plate 55 and only the access plate 55 is pulled. In the second embodiment of the present invention, not only an access plate 155 but also each of adaptors 157 provided on the access plate 155 can be moved.

Figure 8:
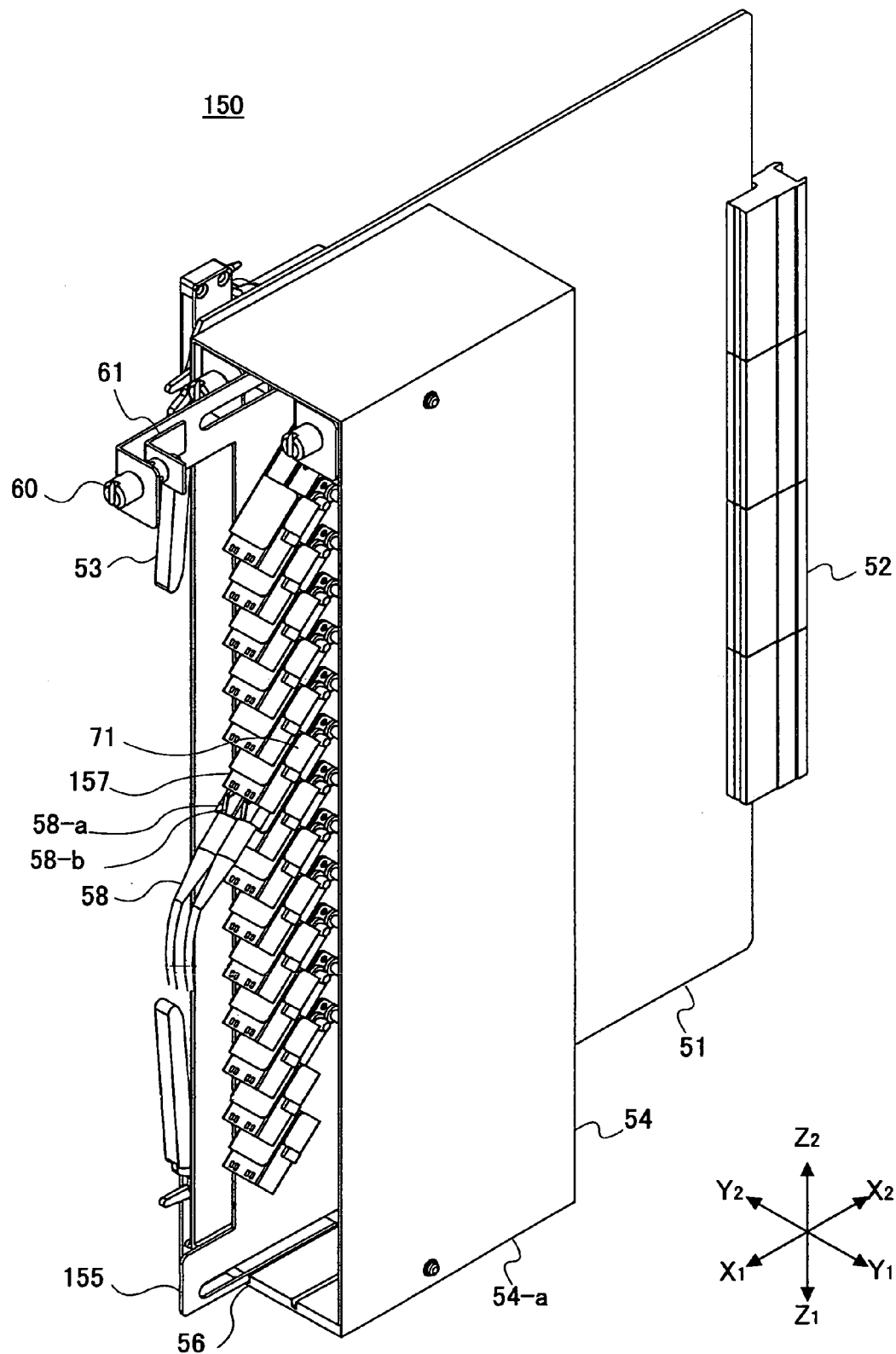
FIG. 8 is a perspective view showing a power interface unit 150 of a second embodiment of the present invention in a state where the outside optical fiber 58 is connected to an adaptor part 157 provided at an access plate 155 and the access plate 155 is pulled out from the access plate receiving part 54.

FIG. 8 is a perspective view showing a power interface unit 150 of the second embodiment of the present invention in a state where the outside optical fiber 58 is connected to the adaptor part 157 provided at the access plate 155 and the access plate 155 is pulled out from the access plate receiving part 54.

In FIG. 8, for the convenience of explanation, a state where only the single outside optical fiber 58 is connected to the adaptor part 57 is shown and an illustration of connection of other outside optical fibers 58, the inside optical fibers, 59, and the other adaptor parts 157 is omitted.

Figure 9:
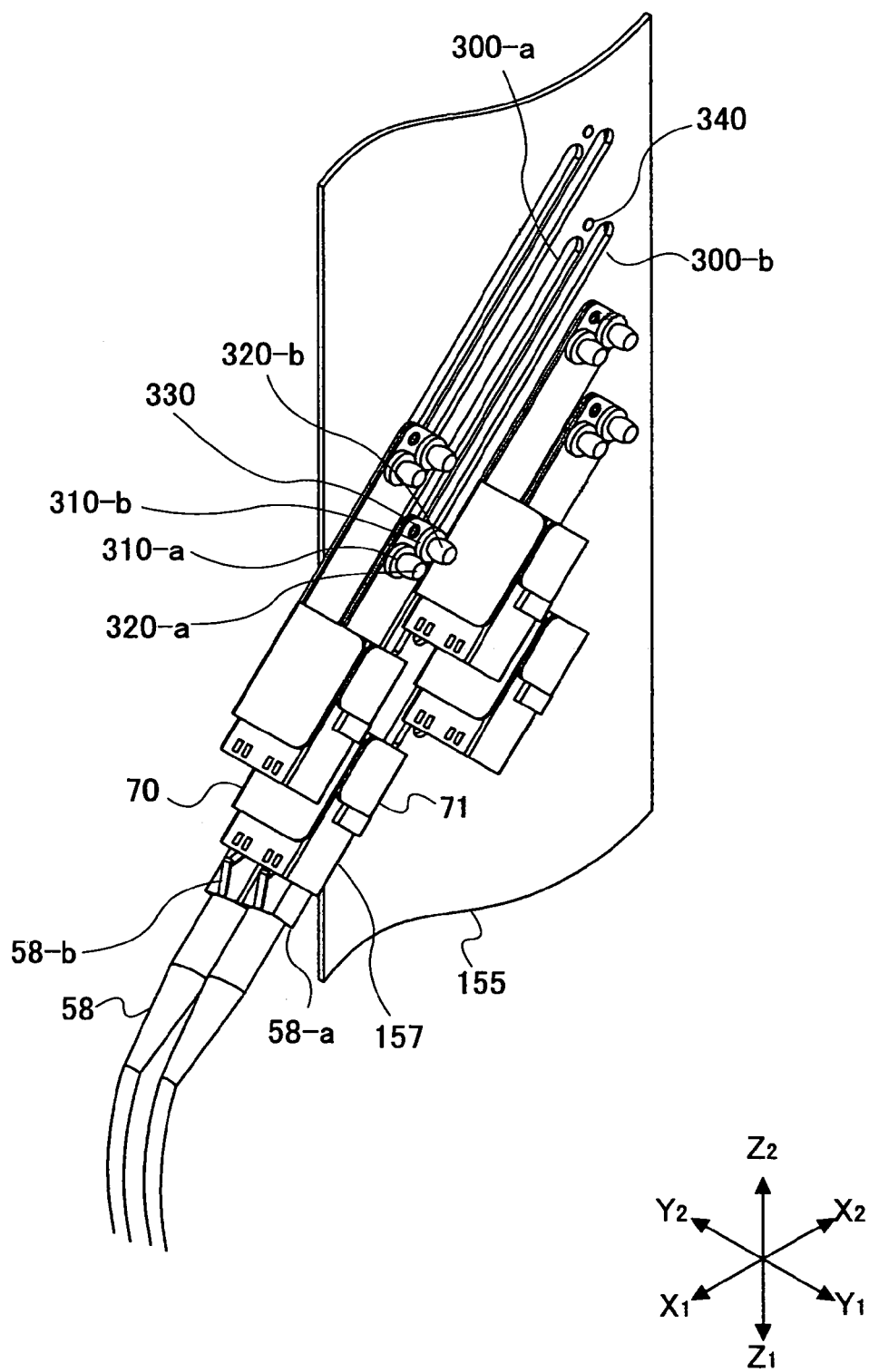
FIG. 9 is an enlarged perspective view showing the vicinity of the adaptor part 157 provided at the access plate 155 shown in FIG. 8.

FIG. 9 is an enlarged perspective view showing the vicinity of the adaptor part 157 provided at the access plate 155 shown in FIG. 8.

Figure 10:
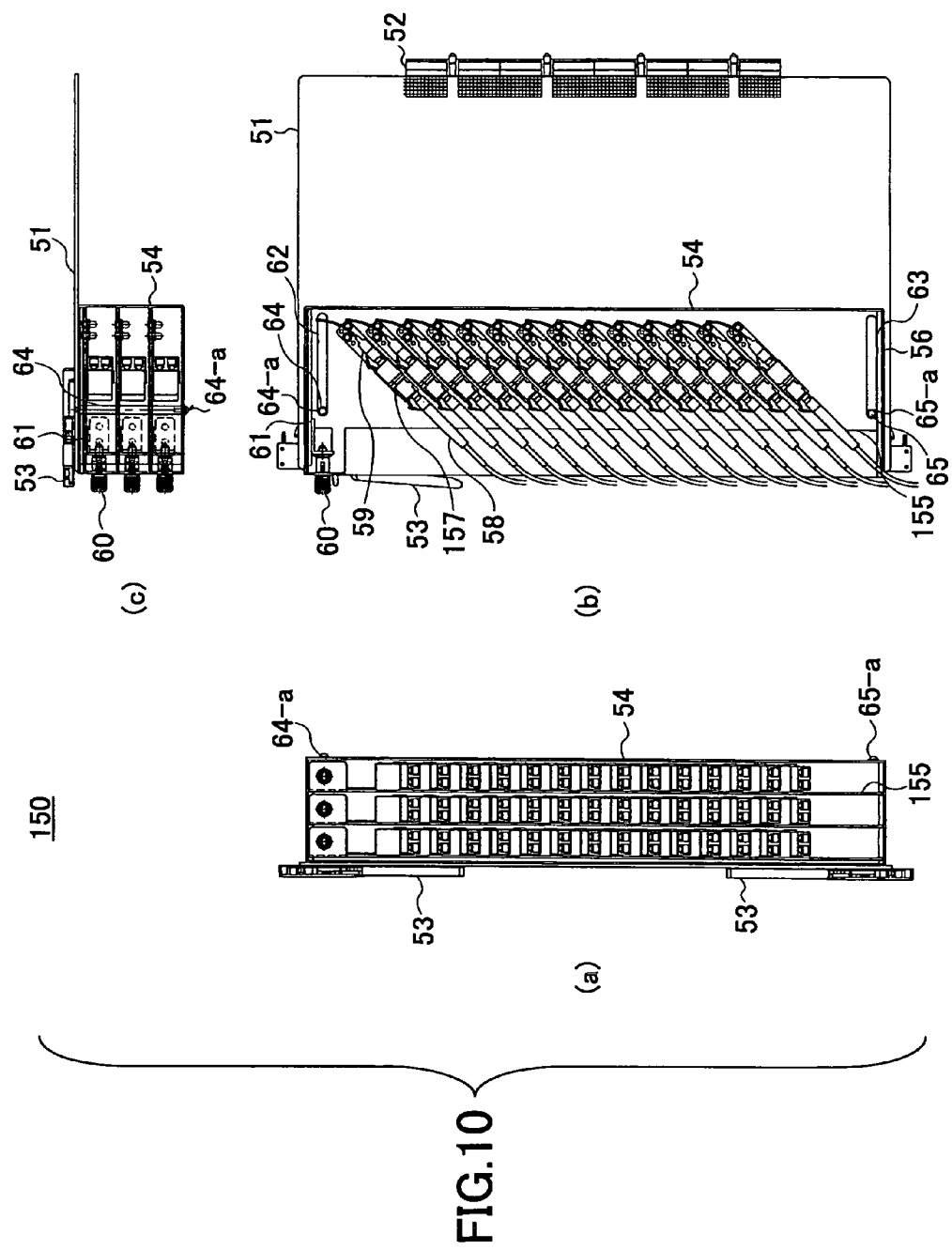
FIG. 10 is a view showing the power interface unit 150 of the second embodiment of the present invention in a state where the outside optical fiber 58 and the inside optical fiber 59 are connected to the adaptor part 157 provided at the access plate 155 received in the access plate receiving part 54.

FIG. 10 is a view showing the power interface unit 150 of the second embodiment of the present invention in a state where the outside optical fiber 58 and the inside optical fiber 59 are connected to the adaptor part 157 provided at the access plate 155 received in the access plate receiving part 154. More specifically, FIG. 10-(a) is a front view, FIG. 10-(b) is a side view in a state where the side surface plate 54-a (See FIG. 8) is removed from the access plate receiving part 54, and FIG. 10-(c) is a plan view. Although three access plates 155 are received in the access plate receiving part 54 in FIG. 4, there is no limitation regarding the number of the access plates 155 received in the access plate receiving part 154 in this embodiment.

In the second embodiment, as shown in FIG. 9, two inclination slit forming parts 300-a and 300-b are formed in parallel for each of the adaptor parts 157 in the access plate 155 so that each of the adaptor parts 157 provided on the access plate 155 can slide on the access plate 155.

In the second embodiment, as well as the first embodiment, in the access plates 155, a lot of adaptor parts 157 are provided in the Z1-Z2 direction in parallel so as to be inclined at a designated angle against the X-Y plane. The above-mentioned inclination slit forming parts 300-a and 300-b have an inclination angle against the X-Y plane the same as the inclination angle against the X-Y plane of the adaptor part 157, as shown in FIG. 9.

Figure 11:
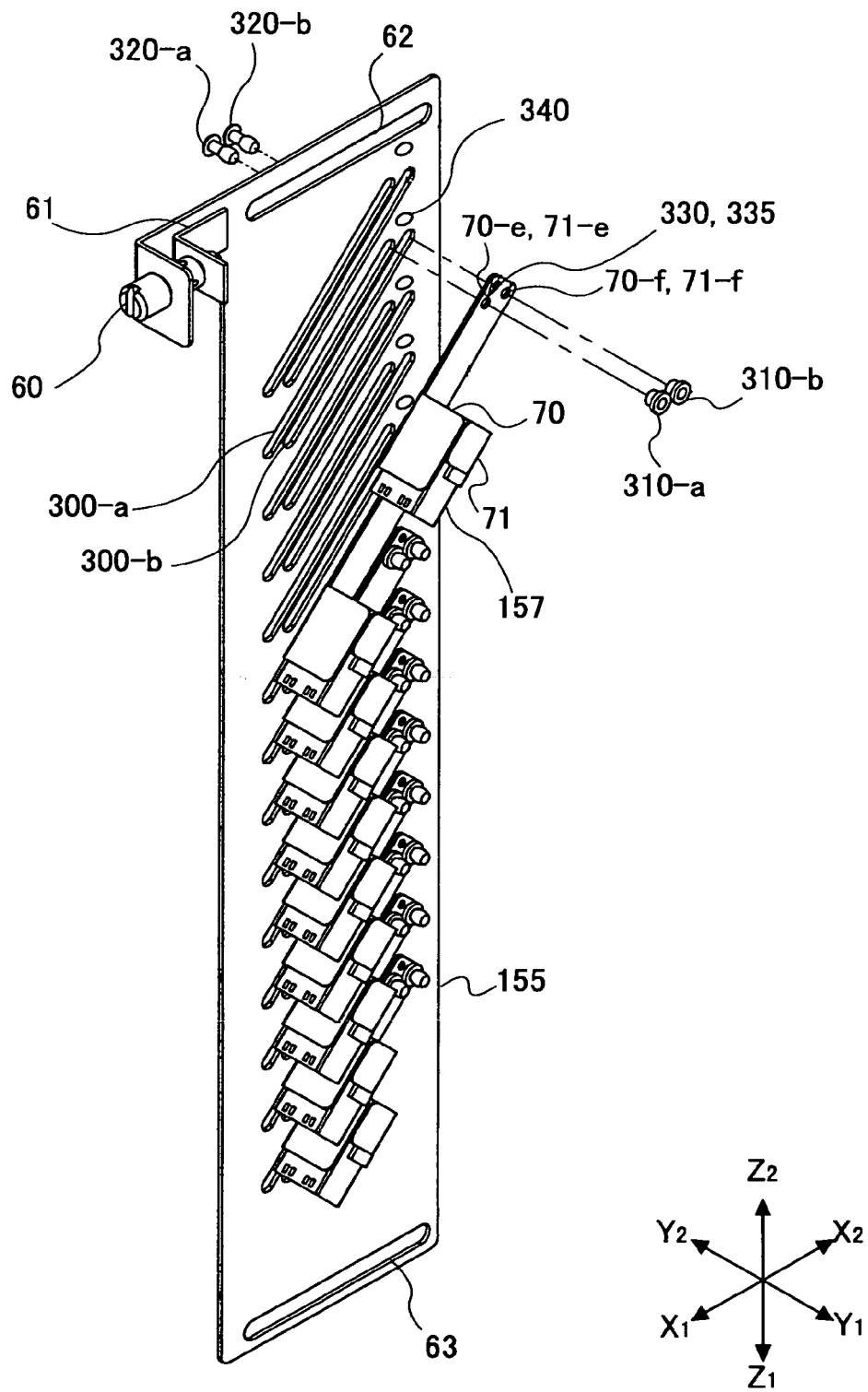
FIG. 11 is a perspective view of the access plate 155 showing a structure where the adaptor part 157 is installed in the access plate 155.

Meanwhile, FIG. 11 is a perspective view of the access plate 155 showing a structure where the adaptor part 157 is installed on the access plate 155.

Referring to FIG. 11, the hole forming parts 70-e and 71-e as overlapping and the hole forming parts 70-f and 71-f as overlapping are provided in designated positions of the side surface 70-a of the first adaptor support metal fitting 70 and the side surface 71-a of the second adaptor support metal fitting 71.

A first bushing member 310-a is installed in the Y1-Y2 direction and a first rivet member 320-a is installed in the Y2-Y1 direction in the inclination slit forming part 300-a, the hole forming part 70-e of the side surface 70-a of the first adaptor support metal fitting 70 and the hole forming part 71-e of the side surface 71-a of the second adaptor support metal fitting 71. A second bushing member 310-b is installed in the Y1-Y2 direction and a second rivet member 320-b is installed in the Y2-Y1 direction in the inclination slit forming part 300-b, the hole forming part 70-f of the side surface 70-a of the first adaptor support metal fitting 70 and the hole forming part 71-f of the side surface 71-a of the second adaptor support metal fitting 71.

Therefore, the first adaptor support metal fitting 70 and the second adaptor support metal fitting 71 where the adaptor part 157 is fixed are movably connected to the inclination slit forming part 300-a via the first bushing member 310-a and the first rivet member 320-a and the inclination slit forming part 300-b via the second bushing member 310-b and the second rivet member 320-b. Hence, the adaptor part 157 provided at the access plate 155 can slide along the inclination slit forming parts 300-a and 300-b.

Meanwhile, as shown in FIG. 9 and FIG. 11, a hole forming part 330 is formed in the vicinity of the hole forming part 70-e in the side surface 70-a of the first adaptor support metal fitting 70 and a hole forming part 335 is formed in the vicinity of the hole forming part 71-f in the side surface 71-a of the second adaptor support metal fitting 71 so as to overlap each other. Furthermore, projection parts 340 are formed in the vicinity of a right end of the inclination slit forming part 300-a and the right end of the inclination slit forming part 300-b. A configuration in X-Z cross section of the projection parts 340 substantially the same as configurations of the hole forming parts 330 and 350.

Therefore, if the first adaptor support metal fitting 70 and the second adaptor support metal fitting 71 which fix the adaptor part 157 are slid along the slit forming parts 300-a and 300-b in the X2 direction in FIG. 11, the hole forming parts 330 and 335 and the projection parts 340 are engaged so that the first adaptor support metal fitting 70 and the second adaptor support metal fitting 71 become fixed. As a result of this, hypothetically even if an unexpected force is applied to the first adaptor support metal fitting 70 and the second adaptor support metal fitting 71, the first adaptor support metal fitting 70 and the second adaptor support metal fitting 71 which fix the adaptor part 157 are prevented from being moved out in the X1 direction in FIG. 11.

In a case where the first adaptor support metal fitting 70 and the second adaptor support metal fitting 71 which fix the adaptor part 157 are pulled out in the X1 direction in FIG. 11, the first adaptor support metal fitting 70 and the second adaptor support metal fitting 71 stop sliding along the inclination slit forming parts 300-a and 300-b due to the first adaptor support metal fitting 70 and the second adaptor support metal fitting 71 becoming fixed to the access plate 155. The first adaptor support metal fitting 70 and the second adaptor support metal fitting 71 which fix the adaptor part 157 may become-fixed to the access plate 155 by forming hole forming parts and projection parts in the vicinity of a left side of the inclination slit forming parts 300-a and 300-b and engaging the hole forming parts and the projection parts.

Referring back to FIG. 8 and FIG. 9, the outside optical fiber connector engaging part 58-b is provided in the Z2 direction. This structure is effective when there is a limitation on the length in a vertical direction, namely Z1-Z2 the direction in the optical communication equipment.

That is, hypothetically if the adaptor part 157 is provided so that the outside optical fiber connector engaging part 58-b is provided in the Y1 or Y2 direction in FIG. 8 and FIG. 9, the length in the Z1-Z2 direction occupied by the adaptor part 157 is longer than a state shown in FIG. 8 and FIG. 9. Therefore, if the structure shown in FIG. 8 and FIG. 9 is not used, it is not possible to correspond to a state where there is a limitation on the length in a vertical direction, namely the Z1-Z2 direction in the optical communication equipment.

However, by applying the structure shown in FIG. 8 and FIG. 9, it is possible to shorten the length in the Z1-Z2 direction occupied by the adaptor part 157 so that it is possible to correspond to the state where there is a limitation on the length in a vertical direction, namely the Z1-Z2 direction in the optical communication equipment.

That is, in the second embodiment, as well as the first embodiment, it is possible to prevent the access plate 155 from being moved out from the access plate receiving part 54 by smoothly pulling out the access plate 155 where the adaptor part 157 is provided and the stick members 64 and 65 contacting the right ends of the slit forming parts 62 and 63. Furthermore, it is possible to easily slide and pull out the adaptor part 157 by obliquely pulling so that minimum members such as the first adaptor support metal fitting 70 and the second adaptor support metal fitting 71 become separated from the access plate 155.

Accordingly, in order to correspond to a state where there is a limitation on the length in a vertical direction, namely the Z1-Z2 direction in the optical communication equipment, it is possible to mount a large number of the outside optical fiber connector engaging parts 58-*b* in the Z2 direction in FIG. 8 and FIG. 9 without forming a dead space. Furthermore, it is possible to easily connect or detach the outside optical fiber 58 to or from the adaptor part 157. Hence, it is possible to realize an optical interface for a large number of channels by a simple mechanism and at a high density.

Although the outside optical fiber connector engaging part 58-*b* is provided in the Z2 direction in the example shown in FIG. 8 and FIG. 9, the present invention is not limited to this structure. The outside optical fiber connector engaging part 58-*b* may be provided in the Z1 direction in the example shown in FIG. 8 and FIG. 9.

Since a structure where the adaptor part 157 is provided at the access plate 55 by using the first adaptor support metal fitting 70 and the second adaptor support metal fitting 71 in the second embodiment is the same as the first embodiment, the explanation thereof is omitted.

Third Embodiment

Next, the third embodiment of the present invention is discussed. In the third embodiment, parts that are the same as the parts shown in the first embodiment and second embodiment are given the same reference numerals, and explanation thereof is omitted.

As described above, in the first embodiment of the present invention, the adaptor part 57 is fixed to the access plate 55 and only the access plate 55 is pulled. In the second embodiment of the present invention, not only an access plate 155 but also each of adaptors 157 provided on the access plate 155 can be moved. In the third embodiment of the present invention, adaptor parts 257 provided at an upper side of the access plate 255 move radially as connectors by sliding the access plate 255. The adaptor parts 57, provided at a lower side of the access plate 255 and having a structure the same as the second embodiment, move separately from the adaptor parts 257 provided at the upper side of the access plate 255.

Figure 12:
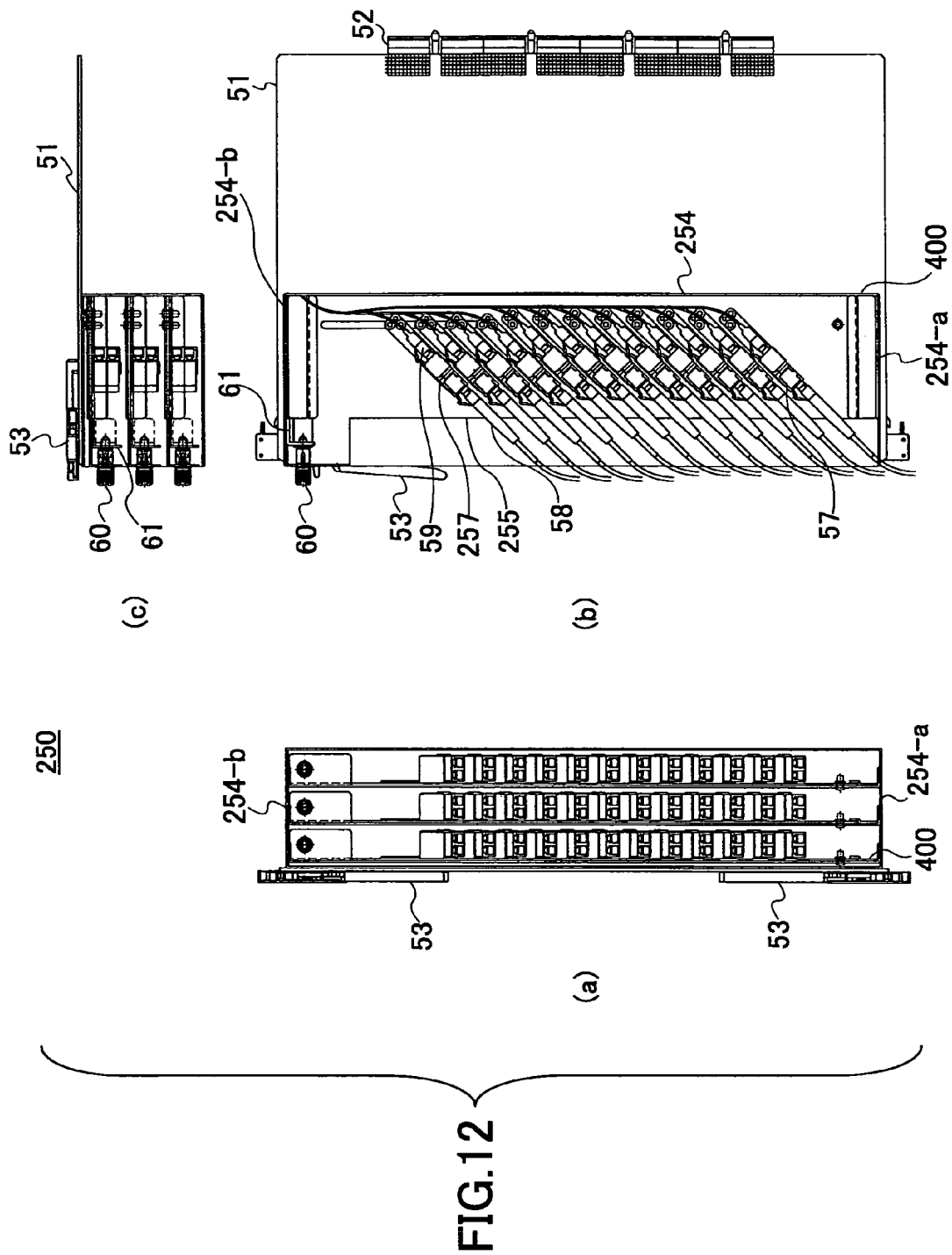
FIG. 12 is a view showing a power interface unit 250 of a third embodiment of the present invention in a state where the outside optical fiber 58 and the inside optical fiber 59 are connected to adaptor parts 57 and 257 provided at an access plate 255 received in an access plate receiving part 254.

FIG. 12 is a view showing a power interface unit 250 of the third embodiment of the present invention in a state where the outside optical fibers 58 and the inside optical fibers 59 are connected to adaptor parts 57 and 257 provided at the access plate 255 received in an access plate receiving part 254. More specifically, FIG. 12-(*a*) is a front view, FIG. 12-(*b*) is a perspective view of a side surface, and FIG. 12-(*c*) is a plan view. Although three access plates 255 are received in the access plate receiving part 254 in FIG. 12, there is no limitation regarding the number of the access plates 255 received in the access plate receiving part 254 in this embodiment.

Referring to FIG. 12, the power interface unit 250 having a connection mechanism for an optical fiber of the third embodiment of the present invention includes the print board 51, the connector 52, the insert-extract operation part 53, the access plate receiving part 254 and others.

A support plate part 400 is provided on a lower surface 254-*a* of the access plate receiving part 254. The access plate 255 is slide-ably provided at the support plate part 400. A structure where the access plate 255 is installed on the support plate part 400 is described below.

The access plate 255, for example, is made of stainless. A lot of adaptor parts 57 and 257 are provided on each of the access plates 255. The outside optical fiber 58 and the inside optical fiber 59 are detachably connected to the adaptor part 57 or 257.

As in the first embodiment and the second embodiment of the present invention, the screw part 60 for fixing is provided at an upper part of the access plate 255. The screw part 60 for fixing is screw-fixed to the metal fitting 61 which is provided at the access plate receiving part 254. If the screw-fixing between the screw part 60 and the metal fitting 61 is off, the access plate 255 can be pulled out from the access plate receiving part 25.4.

Figure 13:
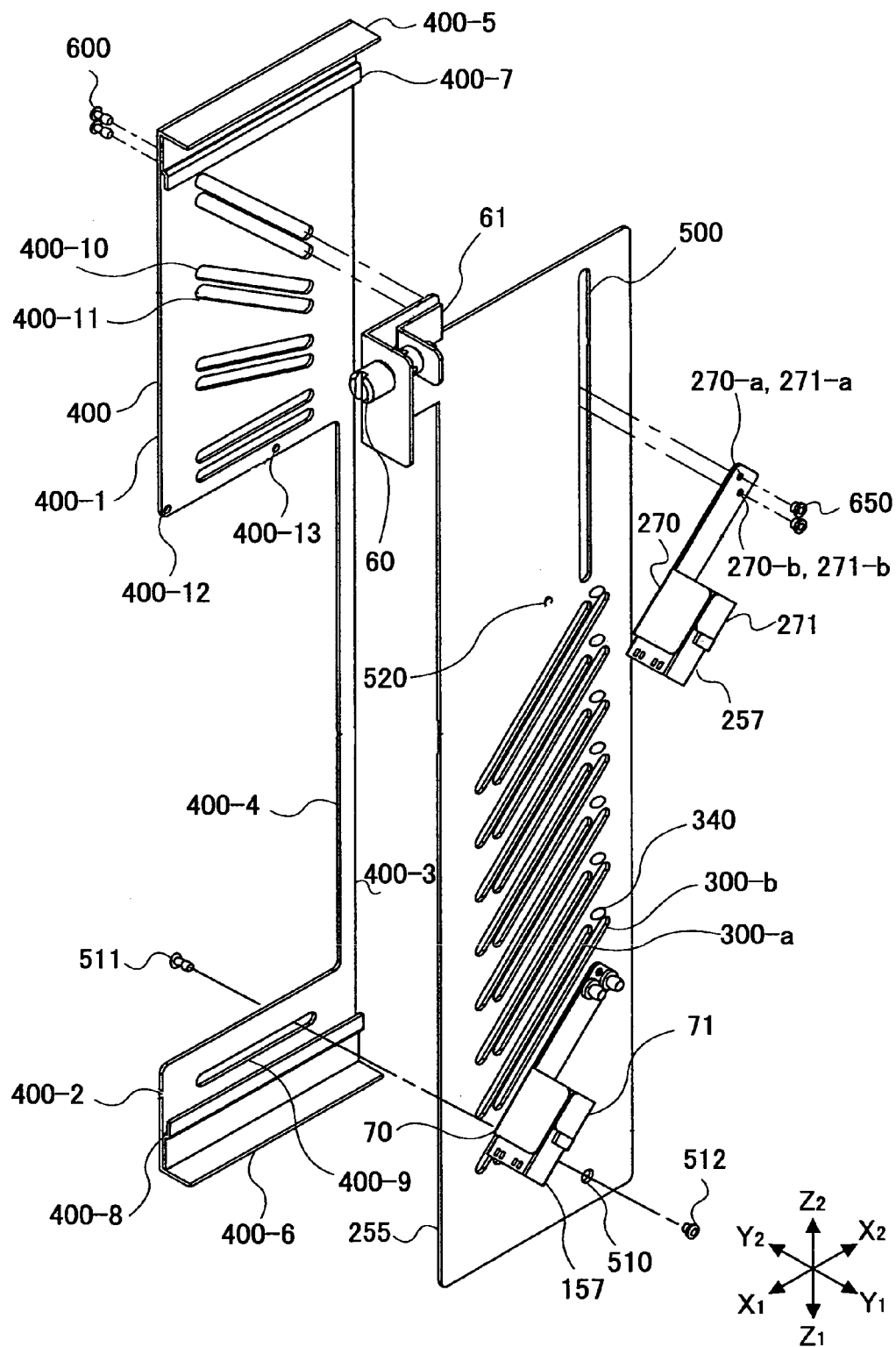
FIG. 13 is a perspective view showing a structure where the access plate 255 shown in FIG. 12 is installed on a support plate part 400.

FIG. 13 is a perspective view showing a structure where the access plate 255 shown in FIG. 12 is installed on the support plate part 400.

Referring to FIG. 13, in the X-Z plane, the support plate part 400 has an upper part side surface part 400-1, a lower part side surface part 400-2, and a connection side surface part 400-3 connecting the upper part side surface part 400-1 and the lower part side surface part 400-2. In addition, a notch part 400-4 is formed in the X-Z plane of the support plate part 400 by the upper part side surface part 400-1, the lower part side surface part 400-2, and the connection side surface part 400-3.

Furthermore, an upper part fixing surface 400-5 is extended from a most upper end of the upper part side surface part 400-1 in the Y1 direction. A lower part fixing surface 400-6 is extended from a lowest end of the lower part side surface part 400-2 in the Y1 direction. The support plate part 400 is fixed to the access plate receiving part 254 by contact between the upper part fixing surface 400-5 and the upper surface 254-*b* of the access plate receiving part 254 shown in FIG. 12 and contact between the lower part fixing surface 400-6 and the lower surface 254-*a* of the access plate receiving part 254 shown in FIG. 12. As a result of this, the access plate supported by the support plate part 400 is received in the access plate receiving part 254.

Furthermore, an upper part groove forming part 400-7 having a Y-Z cross section which opens in the Z1 direction is provided at an upper part of the upper part side surface part 400-1 in the Y1 direction. A lower part groove forming part 400-8 having a Y-Z cross section which opens in the Z2 direction is provided at a lower part of the lower part side surface part 400-2 in the Y1 direction.

A plurality of pairs of a first radial slit forming part 400-10 and a second radial slit forming part 400-11 having the same inclination surfaces are formed in an inside of the upper part side surface part 400-1.

At a left end part (an end part in the X1 direction) of a lower part of the upper part side surface part 400-1, a first engaging hole forming part 400-12 is formed. Furthermore, a second engaging hole forming part 400-13 is formed at a position separated by a designated length in the X2 direction from the first engaging hole forming part 400-12. A slit forming part 400-9 is formed in the X1-X2 direction at an inside of the lower part side surface part 400-2.

As in the second embodiment, at the lower part of the access plate 255, plural pairs of inclination slit forming parts 300-a and 300-b are formed in parallel at a designated angle for each of the adaptor parts 57. Because of this structure, the adaptor part 57 which is fixed by the first adaptor support metal fitting 70 and the second adaptor support metal fitting 71 can slide at the access plate 155.

A vertical slit forming part 500 is formed in the Z1-Z2 direction at a right side of the access plate 255, namely at a side of the X2 direction. A lower end part at a side of the Z1 direction of the vertical slit forming part 500 is formed at a side (at side of the Z2 direction) higher than the uppermost inclination slit forming part 300-a.

A projection part 520 is formed at a right lower side of the lower end of the vertical slit forming part 500 so as to extend in the Y2 direction. Furthermore an access plate installation hole forming part 510 is formed at a lower part of the access plate 255.

Next, structures where the adaptor part 257 shown in FIG. 13 is installed on the access plate 255 and the support plate 400, and the access plate 255 is installed on the support plate part 400 are discussed below.

Figure 14:
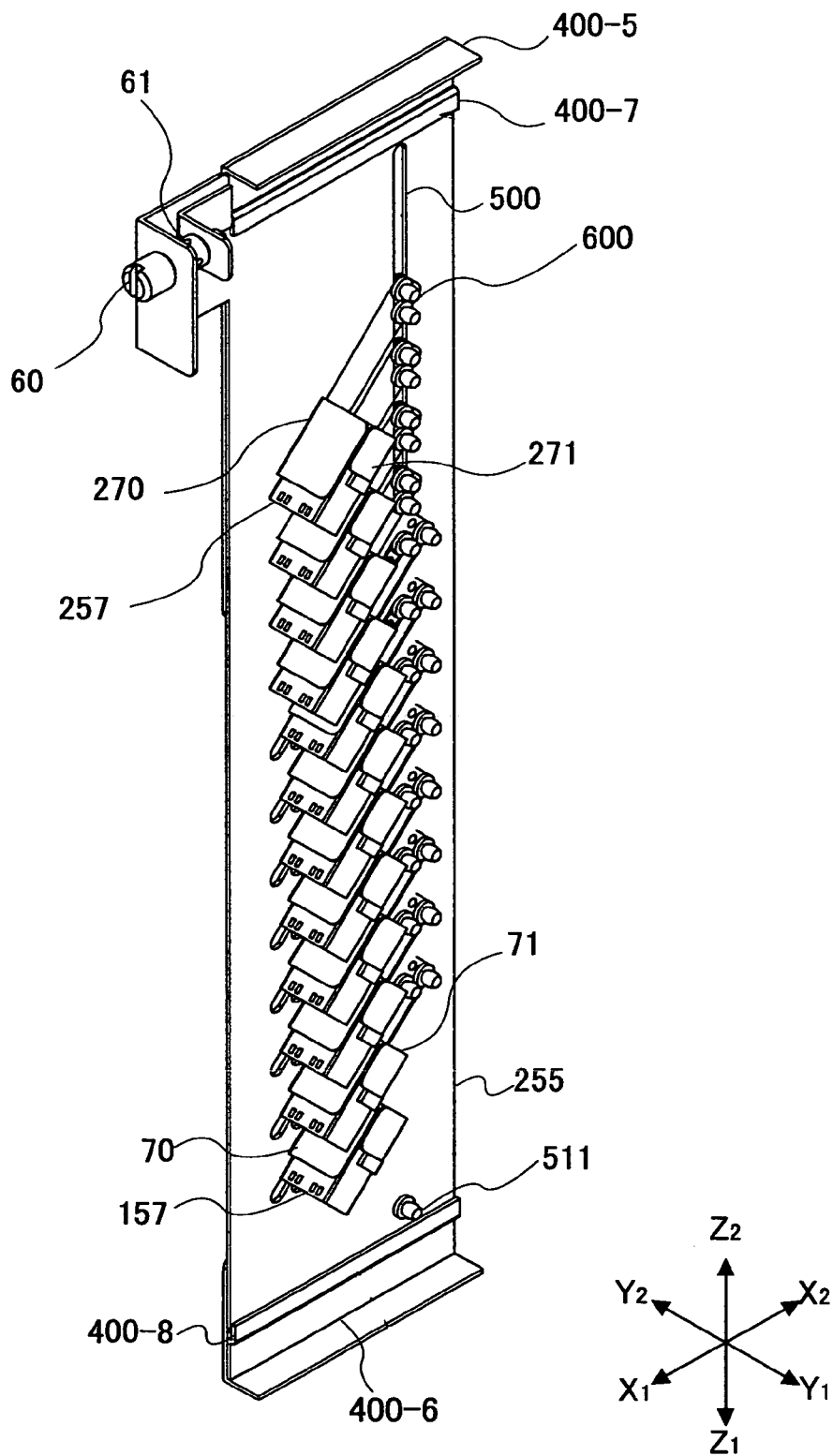
FIG. 14 is a perspective view showing a state where the adaptor part 257 shown in FIG. 13 is installed on the access plate 255 and the support plate 400 and the access plate 255 is installed on the support plate part 400.

FIG. 14 is a perspective view showing a state where the adaptor part 257 shown in FIG. 13 is installed on the access plate 255 and the support plate 400 and the access plate 255 is installed on the support plate part 400.

Referring to FIG. 13 and FIG. 14, the length in the Z1-Z2 direction of the access plate 255 is substantially the same as the length between the upper part groove forming part 400-7 and the lower part groove forming part 400-8. Therefore, the upper end part of the access plate 255 is inserted into the opening part of the upper part groove forming part 400-7 of the support plate forming part 400 and the lower end part of the access plate 255 is inserted into the opening part of the lower part groove forming part 400-8 of the support plate forming part 400, so that the access plate 255 is supported by the upper part groove forming part 400-7 and the lower part groove forming part 400-8.

The access plate installation hole forming part 510 is positioned so as to contact the right end (at the side of the X2 direction) of the slit forming part 400-9 when the access plate 255 is provided at the upper part groove forming part 400-7 and the lower part groove forming part 400-8 so that the right end (at the side of the X2 direction) of the access plate 255 is consistent with the right end of the support plate part 400 (at the side of the X2 direction). In this case, the projection part 520 having a X-Z cross section whose configuration is substantially the same as the second engaging hole forming part 400-13 is engaged with the second engaging hole forming part 400-13.

The access plate installation hole forming part 510 formed in the access plate 255 is installed in the slit forming part 400-9 via the bushing 512. Hence, when the access plate 255 slides along the upper part groove forming part 400-7 and the lower part groove forming part 400-8 of the support plate part 400 in the X1 direction so that the rivet 511 and the bushing 512 come in contact with the left end of the slit forming part 400-9 (at the side of the X1 direction), this slide stops. In this case, the projection part 520 having an X-Z cross section whose configuration is substantially the same as the first engaging hole forming part 400-12 is engaged with the first engaging hole forming part 400-12.

The right end of the first radial slit forming part 400-10 (at the side of the X2 direction) and the right end of the second radial slit forming part 400-11 (at the side of the X2 direction) are positioned so as to overlap with the vertical slit forming part 500 when the access plate 255 is provided at the upper part groove forming part 400-7 and the lower part groove forming part 400-8 so that the right end of the access plate 255 (at the side of the X2 direction) is consistent with the right end of the support plate part 400 (at the side of the X2 direction).

Furthermore, the left end of the first radial slit forming part 400-10 (at the side of the X1 direction) and the left end of the second radial slit forming part 400-11 (at the side of the X2 direction) are positioned so as to overlap with the vertical slit forming part 500 when the access plate 255 is pulled out to the X1 direction side until the rivet 511 and the bushing 512 come in contact with the left end of the slit forming part 400-9.

Meanwhile, the adaptor part 257 is fixed by a first adaptor support metal fitting 270 and a second adaptor support metal fitting 271 having structures substantially similar with those of the first and second embodiments. The first adaptor support metal fitting 270 and the second adaptor support metal fitting 271 are different from the first adaptor support metal fitting 70 and the second adaptor support metal fitting 71 in the following point.

That is, positions of hole forming parts 270-a and 271-a of the first and second adaptor support metal fittings 270 and 271 are different from the ones of the first and second adaptor support metal fittings 70 and 71 in the first and second embodiments. As shown in FIG. 12-(b), both adaptor part 57 and the adaptor part 257 are provided in parallel at a substantially same inclination angle against the X-Z surface in a state where the access plate 255 is not pulled out from the access plate receiving part 254 but received in the access plate receiving part 254. In this state, the hole forming parts 270-a and 270-b of the first adaptor support metal fittings 270 and the hole forming parts 271-a and 271-b of the second adaptor support metal fittings 271 pierce the vertical slit forming part 500.

The first adaptor support metal fittings 270 and the second adaptor support metal fittings 271 which fix the adaptor part 257 are movably fixed to the access plate 255 and the support plate part 400 by inserting and engaging the rivet 600 and the bushing 610 into the hole forming parts 270-a and 271-a, the vertical slit forming part 500, the first radial slit forming part, the hole forming parts 270-b and 271-b, the vertical slit forming part 500, and the second radial slit forming part 400-11.

Figure 15:
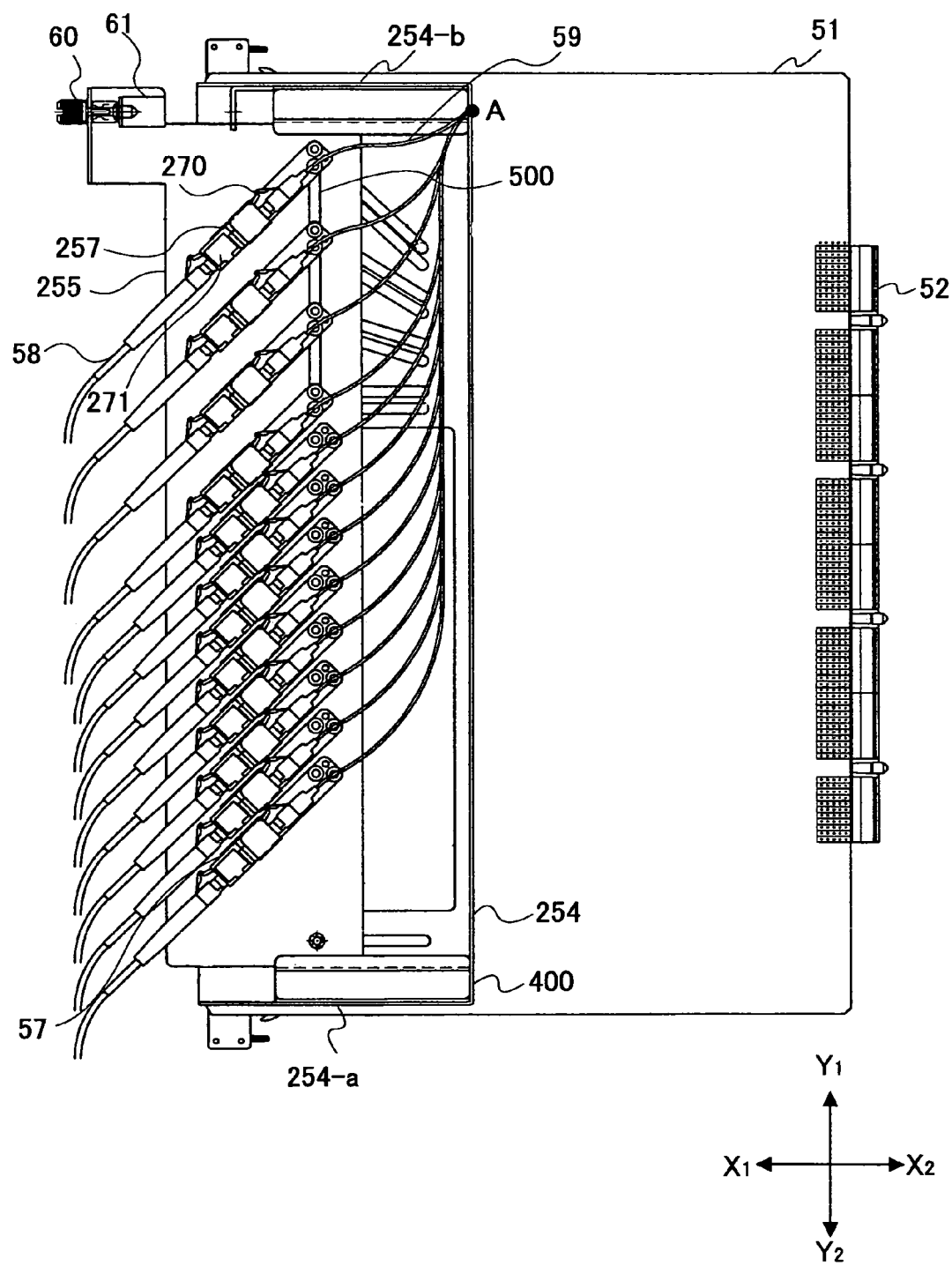
FIG. 15 is a side view showing a state where the access plate 255 shown in FIG. 13

FIG. 15 is a side view showing a state where the access plate 255 shown in FIG. 13 and FIG. 14 is pulled out from the support plate 400 in the X1 direction of FIG. 13 and FIG. 14.

Referring to FIG. 15, if the access plate 255 shown in FIG. 13 and FIG. 14 is slid in the X1 direction in FIG. 13 and FIG. 14 from the support plate part 400, the first adaptor support metal fittings 270 and the second adaptor support metal fittings 271 which fix the adaptor part 257 slide along the vertical slit forming part 500, the first radial slit forming part 400-10 and the second radial slit forming part 400-11.

That is, in FIG. 15, each of the adaptor parts 257 moves radially at a same length in the X1 direction and at a length based on inclination angle of the first radial slit forming part 400-10 and the second radial slit forming part 400-11 in the Y1 direction.

Therefore, if the access plate 255 slides from the support plate part 400 in the X1 direction in FIG. 15, the first adaptor support metal fittings 270 and the second adaptor support metal fittings 271 which fix the adaptor part 257 form an area in a height direction (in the Y1 direction) sufficient to operate on the adaptor part 257.

Referring to FIG. 13 and FIG. 15, although a pair of the first and second radial slit forming parts 400-10 and 400-11 are provided for every adaptor part 257, an inclination angle thereof depends on the pair thereof. More specifically, the uppermost adaptor part 257 is positioned higher at the side of Y1 direction (FIG. 15), the bigger the inclination of the first and second radial slit forming parts 400-10 and 400-11 is.

Under this structure, even if the length of the inside optical fiber 59 connected to the adaptor part 257 is not sufficient, the inside optical fiber 59 rotates in a state where point A shown in FIG. 15 is a center point by sliding the adaptor part 257 along the vertical slit forming part 500 and the first and second radial slit forming parts 400-10 and 400-11 and is not pulled more than necessary. That is, the above-mentioned inclination angle is provided so that the adaptor part 257 slides without changing the length of the inside optical fiber 59 before or after the adaptor part 257 slides.

Therefore, it is possible to secure an area sufficient to operate the adaptor part 257 in the height direction (Y1-Y2 direction) by sliding and pulling the access plate 255 from the support plate part 400 in the X1 direction in FIG. 15.

Figure 16:
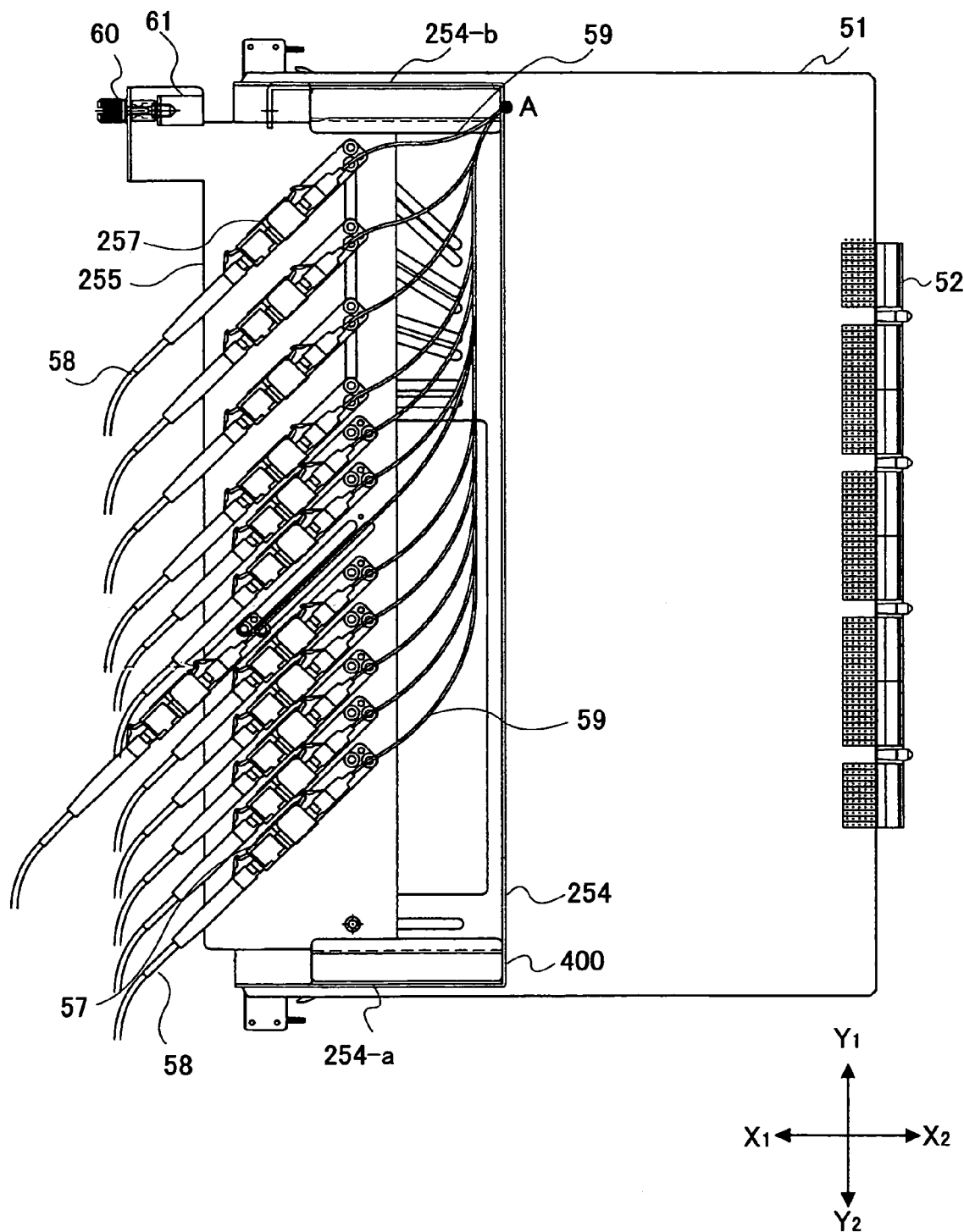
FIG. 16 is a side view showing a state where, in the state shown in FIG. 15, one of the first adaptor support metal fittings 70 and one of the second adaptor support metal fittings 71 which fix the adaptor part 157 are pulled out from the access plate 255 in the X1 direction.

FIG. 16 is a side view-showing a state where, in the state shown in FIG. 15, the first adaptor support metal fitting 70 and the second adaptor support metal fitting 71 which fix the adaptor part 157 are pulled out from the access plate 255 in the X1 direction.

Referring to FIG. 16, the first and second adaptor support metal fittings 70 and 71 can be slid and moved by a mechanism similar to one of the second embodiment. Since a sufficient length of the inside optical fiber 59 which is connected to the adaptor part 57 situated at a lower side of the access plate 255 is provided, it is not necessary to provide a structure similar to the adaptor part 257.

Meanwhile, in the third embodiment, the outside optical fiber connector engaging parts 58-b connected to the adaptor parts 57 and 257 are provided in the Y1 direction in FIG. 16.

That is, in the third embodiment, as well as the second embodiment, even if the outside optical fiber connector engaging part 58-b is provided in the Y1 direction in FIG. 16 in order to correspond to a case where there is a limitation on the length in a vertical direction, namely the Y1-Y2 direction in FIG. 16, the adaptor part 257 slides radially when the access plate 255 is slid and pulled from the support pate 400 in the X1 direction. As a result of this, a space sufficient to operate the adaptor part 257 in the height direction, namely Y1-Y2 direction, is formed. Furthermore, it is possible to easily slide and pull out the adaptor part 57 obliquely by a minimum member such as the first adaptor support metal fitting 70 and the second adaptor support metal fitting 71, so as to be separated from the access plate 255.

Therefore, in order to correspond to a state where there is a limitation on the length in a vertical direction, namely Z1-Z2 direction (FIG. 3) in the optical communication equipment, it is possible to mount a large number of the outside optical fiber connector engaging parts 58-b in the Z2 direction without forming a dead space. Furthermore, it is possible to easily connect or detach the outside optical fiber 58 to or from the adaptor part 57. Hence, it is possible to realize an optical interface for a large number of channels by a simple mechanism and at a high density.

The present invention is not limited to these embodiments, but variations and modifications may be made without departing from the scope of the present invention.

What is claimed is:

1. A unit installed in electronic equipment, comprising:
   a connector configured to connect a transmission line of the electronic equipment;
   an access plate where a plurality of the connectors are provided, one or more corresponding connectors connectable thereto, the access plate further including a slit forming part;
   a groove forming part; and
   a slide stopper piercing through the slit forming part and configured to make the access plate stop sliding by coming in contact with an end part of the slit forming part;
   wherein the access plate is slidable in the groove forming part between a plurality of positions while attached to the unit.

2. A unit installed in electronic equipment, comprising:
   a plurality of connectors each configured to connect a separate transmission line of the electronic equipment;
   an access plate where at least a first and a second of the plurality of connectors are slidably provided; and
   a support plate part configured to support the access plate so that the access plate is slidable,
   wherein the access plate is slidably provided against the unit and remains slidable between a plurality of positions with respect to the unit while attached thereto,
   the first connector slides against the access plate by sliding the access plate from or to the unit,
   the access plate has a vertical slit forming part formed in a direction perpendicular to a direction in which the access plate slides from or to the unit,
   the support plate has a radial slit forming part which is radially formed, and
   the first connector slides along the vertical slit forming part and the radial slit forming part.

3. A unit installed in electronic equipment, comprising:
   a plurality of connectors each configured to connect a separate transmission line of the electronic equipment; and
   an access plate where at least a first and a second of the plurality of connectors are slidably provided,
   wherein the access plate is slidably provided against the unit and remains slidable between a plurality of positions with respect to the unit while attached thereto,
   the first connector is covered with a covering member, fitted by a fitting member, and provided at the access plate by the covering member and the fitting member,
   an inclination slit forming part is provided obliquely in the access plate,
   the first connector is provided so as to slide along the inclination slit forming part,
   a hole forming part is formed in the covering member and the fitting member,
   a projection part is formed in the vicinity of an end part of the slit forming part of the access plate, and
   the first connector is stopped sliding against the access plate by engaging the projection part with the hole forming part.

4. A connection mechanism for connecting a transmission line of electronic equipment to each of a plurality of connectors provided at a unit installed in the electronic equipment, comprising:

an access plate which has the connectors and is provided in the unit, one or more corresponding connectors connectable thereto, the access plate further including a slit forming part;

a groove forming part; and a slide stopper piercing through the slit forming part;

wherein the access plate slides from the unit in the groove forming part so that the transmission line can be connected to the connector, and wherein the slide stopper comes in contact with an end part of the slit forming part so that the access plate stops sliding from the unit, said access plate remaining slidable between a plurality of positions while attached to the unit.

5. A connection mechanism for connecting a transmission line of electronic equipment to each of a plurality of connectors provided at a unit installed in the electronic equipment, comprising:

an access plate which has the connectors and is provided in the unit, each of the connectors configured to connect a separate transmission line of the electronic equipment;

wherein at least a first one of the plurality of connectors slides from the access plate so that the transmission line can be connected to the first connector, the access plate is slidably provided against the unit, and remains slidable between a plurality of positions while attached to the units, the first connector slides against the access plate by sliding the access plate from the unit so that the transmission line can be connected to the first connector, the unit further includes a support plate part configured to support the access plate so that the access plate is slidable, the access plate has a vertical slit forming part formed in a direction perpendicular to a direction in which the access plate slides from or to the unit, the support plate has a radial slit forming part which is radially formed, and the first connector slides along the vertical slit forming part and the radial slit forming part so that the transmission line can be connected to the first connector.

6. A connection mechanism for connecting a transmission line of electronic equipment to each of a plurality of connectors provided at a unit installed in the electronic equipment, comprising:

an access plate which has the connectors and is provided in the unit, each of the connectors configured to connect a separate transmission line of the electronic equipment;

wherein at least a first one of the plurality of connectors slides from the access plate so that the transmission line can be connected to the first connector, the access plate is slidably provided against the unit, and remains slidable between a plurality of positions while attached to the unit, the first connector is covered with a covering member, fitted by a fitting member, and provided at the access plate by the covering member and the fitting member, an inclination slit forming part is provided obliquely in the access plate, the first connector slides along the inclination slip forming part of the access plate so that the transmission line can be connected to the first connector, a hole forming part is formed in the covering member and the fitting member, a projection part is formed in the vicinity of an end part of the slit forming part of the access plate, and the first connector is stopped sliding against the access plate by engaging the projection part with the hole forming part.

* * * * *